(12) United States Patent
Tsunemori et al.

(10) Patent No.: US 11,198,759 B2
(45) Date of Patent: Dec. 14, 2021

(54) POLYCARBONATE COPOLYMER

(71) Applicant: TEIJIN LIMITED, Osaka (JP)

(72) Inventors: Hideyuki Tsunemori, Osaka (JP); Kenta Imazato, Osaka (JP); Katsuhiro Yamanaka, Osaka (JP)

(73) Assignee: TEIJIN LIMITED, Osaka (JP)

( * ) Notice: Subject to any disclaimer, the term of this patent is extended or adjusted under 35 U.S.C. 154(b) by 60 days.

(21) Appl. No.: 16/628,728

(22) PCT Filed: Jun. 20, 2018

(86) PCT No.: PCT/JP2018/023514
§ 371 (c)(1),
(2) Date: Jan. 6, 2020

(87) PCT Pub. No.: WO2019/009076
PCT Pub. Date: Jan. 10, 2019

(65) Prior Publication Data
US 2020/0283571 A1 Sep. 10, 2020

(30) Foreign Application Priority Data

Jul. 7, 2017 (JP) .............................. JP2017-133704
Sep. 5, 2017 (JP) .............................. JP2017-170163

(51) Int. Cl.
*C08G 64/06* (2006.01)
(52) U.S. Cl.
CPC .................................... *C08G 64/06* (2013.01)
(58) Field of Classification Search
USPC ....................................................... 528/127
See application file for complete search history.

(56) References Cited

U.S. PATENT DOCUMENTS 5,965,688 A * 10/1999 Davies .................. C08G 64/28
528/196
2006/0149024 A1 7/2006 Ono et al.
2012/0164444 A1 6/2012 Kinoshita

FOREIGN PATENT DOCUMENTS

| JP | 38-26798 | 12/1963 |
| JP | 39-1546 | 2/1964 |
| JP | 63-92644 | 4/1988 |
| JP | 2-222416 | 9/1990 |

(Continued)

OTHER PUBLICATIONS

JPH11240945A Machine Translation: Polycarbonate interfacial polymerization process and product; Inventor Jack Dean Davies (Year: 1999).*

(Continued)

*Primary Examiner* — Terressa Boykin
(74) *Attorney, Agent, or Firm* — Wenderoth, Lind & Ponack, L.L.P.

(57) ABSTRACT

The present invention provides a polycarbonate copolymer having low specific gravity and high surface hardness. The polycarbonate copolymer of the present invention contains a unit (A) represented by the following formula (1-1) or (1-2) and a unit (B) represented by the following formula (3); wherein in formula (1-1), $R_1$ and $R_2$ respectively and independently represent a hydrogen atom, hydrocarbon group having 1 to 10 carbon atoms that may contain an aromatic group, or halogen atom, and Y represents a divalent organic residue comprised of the following formula (2); in formula (2), $C_m$ represents a cycloalkylene group, m represents an integer of 3 to 20, $R_3$ represents a hydrogen atom, halogen atom, alkyl group having 1 to 20 carbon atoms or cycloalkyl group having 3 to 20 carbon atoms, and n represents an integer of 1 to 10; in formula (1-2), $R_1'$ and $R_2'$ respectively and independently represent a hydrogen atom, hydrocarbon group having 1 to 10 carbon atoms that may contain an aromatic group or a halogen atom, and W represents a single bond, carbon atom, oxygen atom or sulfur atom; and in formula (3), $R_4$, $R_5$, $R_6$ and $R_7$ respectively and independently represent a hydrogen atom, halogen atom, alkyl group having 1 to 20 carbon atoms or cycloalkyl group having 3 to 20 carbon atoms:

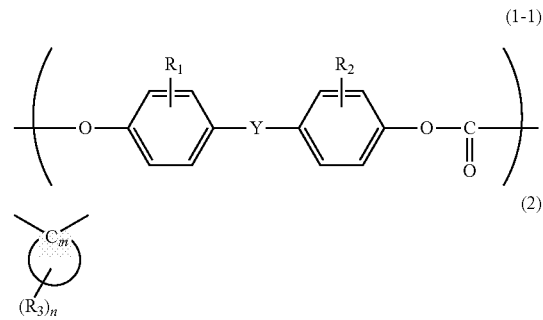

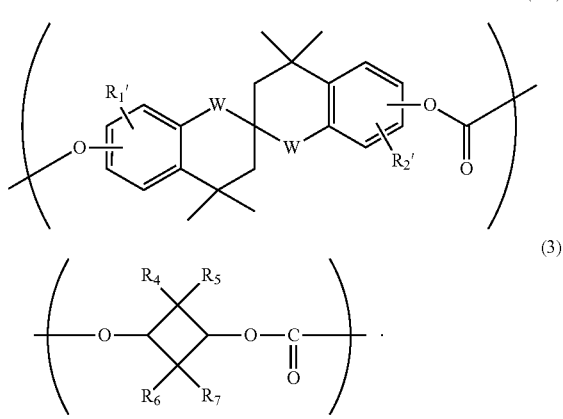

14 Claims, No Drawings

(56) References Cited

FOREIGN PATENT DOCUMENTS

| | | | |
|---|---|---|---|
| JP | 9-52947 | | 2/1997 |
| JP | 11-240945 | | 9/1999 |
| JP | 11240945 | * | 9/1999 |
| JP | 2003-160660 | | 6/2003 |
| JP | 2003-200421 | | 7/2003 |
| JP | 2015-137355 | | 7/2015 |
| WO | 2004/111106 | | 12/2004 |
| WO | 2011/021720 | | 2/2011 |

OTHER PUBLICATIONS

JPH0952947A Machine Translation; Production of aromatic polycarbonate Inventor Wataru Funakoshi; (Year: 1915).*
International Search Report dated Sep. 25, 2018 in International (PCT) Patent Application No. PCT/JP2018/023514.
Ijantkar et al., "Conformational analysis, RIS models and modeling chain properties of substituted homopolycarbonates and aliphatic-aromatic copolycarbonates derived from 2, 2, 4, 4-tetramethyl-1,3-cyclobutylene linkages," MACRO 2004, International Conference om Polymers for Advanced Technologies, Society for Polymer Science, 2004 (abstract CAplus [online], pp. 1-7.

* cited by examiner

POLYCARBONATE COPOLYMER

FIELD

The present invention relates to a polycarbonate copolymer and polycarbonate resin composition, which are preferable for the production of automobile interior parts such as vehicle-mounted displays, car navigation systems, car audio systems, console panels, dashboards or door trim parts, and exterior parts such as headlamp lenses, back doors, bumpers, fenders, door handles, emblems, glazing or motorcycle outer shells. More particularly, the present invention relates to a novel polycarbonate copolymer and polycarbonate resin composition having superior surface hardness, heat resistance, weather resistance and solvent resistance and having low specific gravity.

BACKGROUND

In recent years in the automotive field, it is becoming essential to reduce the weight of automobile parts for the purpose of reducing carbon dioxide gas emission levels and improving fuel consumption. In particular, resin glazing, which is used as an alternative to glass, uses polycarbonate resin that has superior transparency, heat resistance and impact resistance, has a lower specific gravity than glass, offers a higher degree of freedom with respect to shape by selecting injection molding or other processing method, enables body weight to be reduced, since multiple parts are able to be integrated into a single part, and can be expected to result in improved body design and productivity.

On the other hand, molded parts obtained by molding polycarbonate resin have shortcomings such as being susceptible to scratching due to the soft surface, being easily yellowed by sunlight when used outdoors for long periods of time, and having inferior chemical resistance to gasoline and other organic solvents.

Therefore, accompanying the need for further reductions in automobile weight, polycarbonate resin is sought that maintains the superior transparency and heat resistance associated with conventional polycarbonate resin while also demonstrating superior surface hardness, weather resistance and chemical resistance and having low specific gravity.

Furthermore, polycarbonate copolymers consisting of 2,2,4,4-tetramethyl-1,3-cyclobutanediol (abbreviated as TMCB) and an aliphatic diol or bisphenol have been reported (PTL1-5). Although polycarbonates having a structural unit derived from TMCB have superior heat resistance and surface hardness, in the case of having been copolymerized with bisphenols, there were problems with weather resistance and solvent resistance. In addition, in the case of having copolymerized with an aliphatic diol, although the resulting polycarbonate copolymer demonstrates superior weather resistance, there were the problems of inferior heat resistance and surface hardness.

CITATION LIST

Patent Literature

[PTL 1] Japanese Examined Patent Publication No. S38-26798
[PTL 2] Japanese Unexamined Patent Publication No. S63-92644
[PTL 3] Japanese Unexamined Patent Publication No. H2-222416
[PTL 4] Japanese Unexamined Patent Publication No. H11-240945
[PTL 5] Japanese Unexamined Patent Publication No. 2015-137355
[PTL 6] Japanese Examined Patent Publication No. S39-1546
[PTL 7] International Publication No. WO 2004/111106
[PTL 8] International Publication No. WO 2011/021720

SUMMARY

Technical Problem

An object of the present invention is to provide a polycarbonate copolymer and polycarbonate resin composition demonstrating superior surface hardness, heat resistance, weather resistance and solvent resistance and having low specific gravity. In addition, an object of the present invention is to provide a polycarbonate resin composition that is particularly preferable for automobile interior and exterior parts.

Solution to Problem

As a result of conducting extensive research, the inventors of the present invention surprisingly found that, even in the case of polycarbonate resin, the use of a polycarbonate copolymer containing a specific structural unit achieves the aforementioned objects, thereby leading to completion of the present invention as a result of proceeding with further studies based on this finding.

Specifically, the following Configurations 1 to 15 are provided by the present invention.

(Configuration 1)

A polycarbonate copolymer containing a unit (A) represented by the following formula (1-1) or (1-2) and a unit (B) represented by the following formula (3):

[Chem. 1]

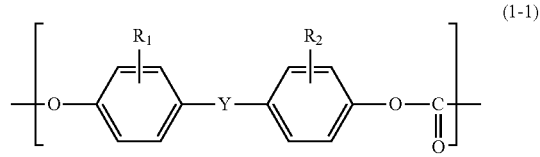

(1-1)

wherein, $R_1$ and $R_2$ respectively and independently represent a hydrogen atom, hydrocarbon group having 1 to 10 carbon atoms that may contain an aromatic group, or halogen atom, and Y represents a divalent organic residue comprised of the following formula (2):

[Chem. 2]

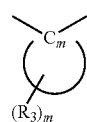

(2)

wherein, $C_m$ represents a cycloalkylene group, m represents an integer of 3 to 20, $R_3$ represents a hydrogen atom, halogen atom, alkyl group having 1 to 20 carbon atoms or cycloalkyl group having 3 to 20 carbon atoms, and n represents an integer of 1 to 10;

[Chem. 3]

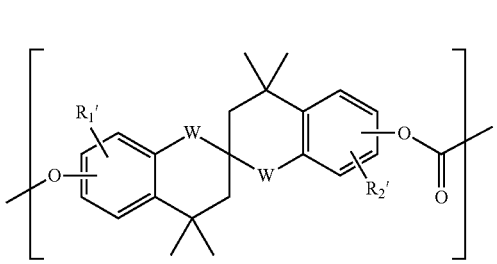

(1-2)

wherein, $R_1'$ and $R_2'$ respectively and independently represent a hydrogen atom, hydrocarbon group having 1 to 10 carbon atoms that may contain an aromatic group or a halogen atom, and W represents a single bond, carbon atom, oxygen atom or sulfur atom;

[Chem. 4]

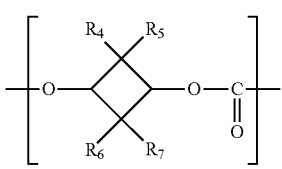

(3)

wherein, $R_4$, $R_5$, $R_6$ and $R_7$ respectively and independently represent a hydrogen atom, halogen atom, alkyl group having 1 to 20 carbon atoms or cycloalkyl group having 3 to 20 carbon atoms.

(Configuration 2)

The polycarbonate copolymer described in Configuration 1, wherein the number average molecular weight as polystyrene as determined by gel permeation chromatography is within the range of 10,000 to 100,000, and the molecular weight distribution (Mw/Mn) is within the range of 1.5 to 3.5.

(Configuration 3)

The polycarbonate copolymer described in Configuration 1 or 2, wherein a dihydroxy compound from which unit (B) is derived is a mixture of cis-trans isomers and the ratio of the cis isomer in the mixture is 50% or more.

(Configuration 4)

The polycarbonate copolymer described in any of Configurations 1 to 3, wherein the dihydroxy compound from which unit (B) is derived has a Hazen color number (APHA) when melted in a nitrogen atmosphere at 220° C. of 100 or less.

(Configuration 5)

The polycarbonate copolymer described in any of Configurations 1 to 4, wherein the viscosity average molecular weight is 10,000 to 40,000.

(Configuration 6)

The polycarbonate copolymer described in any of Configurations 1 to 5, containing a unit represented by the following formula (4) as unit (A):

[Chem. 5]

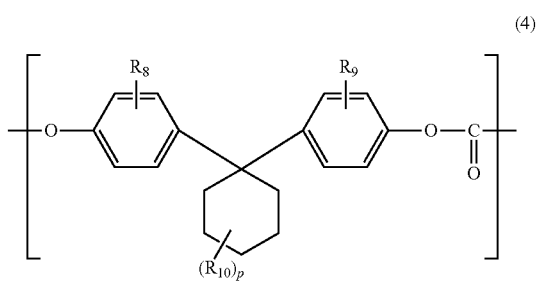

(4)

wherein, $R_8$ and $R_9$ respectively and independently represent a hydrogen atom, hydrocarbon group having 1 to 10 carbon atoms that may contain an aromatic group, or halogen atom, $R_{10}$ represents a hydrogen atom, halogen atom, alkyl group having 1 to 20 carbon atoms or cycloalkyl group having 3 to 20 carbon atoms, and p represents an integer of 1 to 10.

(Configuration 7)

The polycarbonate copolymer described in any of Configurations 1 to 6, containing a unit derived from 1,1-bis(4-hydroxyphenyl)-3,3,5-trimethylcyclohexane as unit (A).

(Configuration 8)

The polycarbonate copolymer described in any of Configurations 1 to 5, containing a unit derived from 6,6'-dihydroxy-3,3,3',3'-tetramethyl-1,1'-spirobiindane as unit (A).

(Configuration 9)

The polycarbonate copolymer described in any of Configurations 1 to 8, containing a unit derived from 2,2,4,4-tetramethyl-1,3-cyclobutanediol as unit (B).

(Configuration 10)

The polycarbonate copolymer described in any of Configurations 1 to 9, further containing a structural unit derived from at least one type of compound selected from the group consisting of aliphatic dihydroxy compounds, alicyclic dihydroxy compounds, oxyalkylene glycols and diols having a cyclic acetal structure.

(Configuration 11)

The polycarbonate copolymer described in Configuration 1, containing unit (A) represented by formula (1-1) and unit (B) represented by formula (2) as main structural units, and wherein the molar ratio (A/B) of unit (A) to unit (B) is 5/95 to 50/50.

(Configuration 12)

The polycarbonate copolymer described in Configuration 1, containing unit (A) represented by formula (1-2) and unit (B) represented by formula (2), and wherein the glass transition temperature is 126° C. to 175° C. and specific gravity as measured according to the method described in JIS 7112 is 1.10 or less.

(Configuration 13)

A resin molded article containing the polycarbonate copolymer described in any of Configurations 1 to 12.

(Configuration 14)

An automobile interior part or automobile exterior part containing the resin molded article described in Configuration 13.

(Configuration 15)

A method for producing the polycarbonate copolymer described in any of Configurations 1 to 12, including a transesterification reaction between a dihydroxy compound and a carbonic acid diester carried out in the presence of an alkaline metal catalyst and/or alkaline earth metal catalyst, wherein the amount used of the alkaline metal catalyst and/or alkaline earth metal catalyst is within the range of 0.1 µmol to 500 µmol per 1 mol of the dihydroxy compound.

Advantageous Effects of Invention

The polycarbonate copolymer of the present invention is preferably used in automobile interior parts or automobile exterior parts as a result of demonstrating superior surface hardness, heat resistance, weather resistance and solvent resistance and having low specific gravity. Thus, the industrial effect demonstrated thereby is extraordinary.

DESCRIPTION OF EMBODIMENTS

The following is a detailed explanation of the present invention.

Polycarbonate Copolymer

The polycarbonate copolymer contains a unit (A) represented by the following formula (1-1) or (1-2) and a unit (B) represented by the following formula (3):

[Chem. 6]

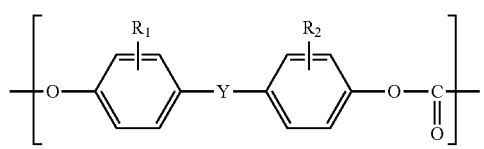
(1-1)

wherein, $R_1$ and $R_2$ respectively and independently represent a hydrogen atom, hydrocarbon group having 1 to 10 carbon atoms that may contain an aromatic group or a halogen atom, and Y represents a divalent organic residue comprised of the following formula (2):

[Chem. 7]

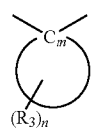
(2)

wherein, $C_m$ represents a cycloalkylene group, m represents an integer of 3 to 20, $R_3$ represents a hydrogen atom, halogen atom, alkyl group having 1 to 20 carbon atoms or cycloalkyl group having 3 to 20 carbon atoms, and n represents an integer of 1 to 10;

[Chem. 8]

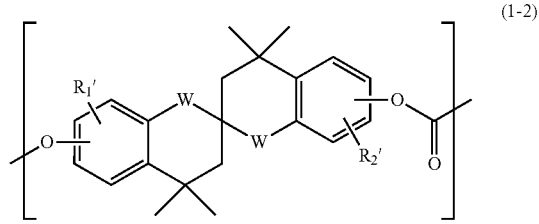
(1-2)

wherein, $R_1'$ and $R_2'$ respectively and independently represent a hydrogen atom, hydrocarbon group having 1 to 10 carbon atoms that may contain an aromatic group or a halogen atom, and W represents a single bond, carbon atom, oxygen atom or sulfur atom:

[Chem. 9]

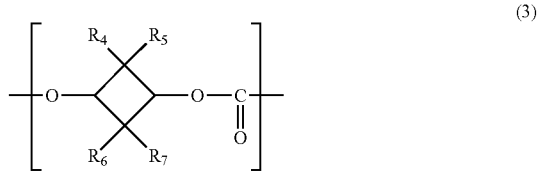
(3)

wherein, $R_4$, $R_5$, $R_6$ and $R_7$ respectively and independently represent a hydrogen atom, halogen atom, alkyl group having 1 to 20 carbon atoms or cycloalkyl group having 3 to 20 carbon atoms.

The inventors of the present invention found that a polycarbonate copolymer containing a unit (A) having the aforementioned formula (1-1) or formula (1-2) and a unit (B) represented by the aforementioned formula (3) demonstrates superior surface hardness, heat resistance, weather resistance and solvent resistance and has low specific gravity. A polycarbonate copolymer having such properties was unable to be obtained in the prior art, and the polycarbonate copolymer of the present invention is extremely useful.

Although polycarbonate copolymers containing unit (B) were previously known, polycarbonate copolymers were not known with respect to having low specific gravity in the case of containing unit (B). Thus, the fact that the polycarbonate copolymer of the present invention containing unit (B) has low specific gravity was unexpected.

In addition, polycarbonate copolymers containing numerous aliphatic moieties generally have superior weather resistance but poor heat resistance, while polycarbonate copolymers containing numerous aromatic moieties are known to have superior heat resistance but poor weather resistance. Moreover, polycarbonate copolymers having a bisphenol backbone are known to have a tendency to have poor solvent resistance in the case the structure linking the two phenol moieties is aliphatic.

However, a polycarbonate copolymer containing unit (A) and unit (B) having superior balance among weather resistance, heat resistance and solvent resistance was unexpected, and a polycarbonate copolymer like that of the present invention also having high surface hardness was also unexpected.

In a first aspect, the polycarbonate copolymer of the present invention contains as main constituent units thereof a unit (A) represented by the following formula (1-1) and a unit (B) represented by the following formula (3):

[Chem. 10]

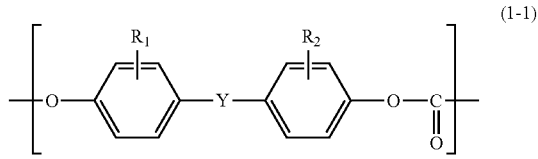
(1-1)

wherein, $R_1$ and $R_2$ respectively and independently represent a hydrogen atom, hydrocarbon group having 1 to 10 carbon atoms that may contain an aromatic group or a halogen atom, and Y represents a divalent organic residue comprised of the following formula (2):

[Chem. 11]

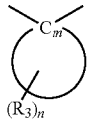
(2)

wherein, $C_m$ represents a cycloalkylene group, m represents an integer of 3 to 20, $R_3$ represents a hydrogen atom, halogen atom, alkyl group having 1 to 20 carbon atoms or cycloalkyl group having 3 to 20 carbon atoms, and n represents an integer of 1 to 10;

[Chem. 12]

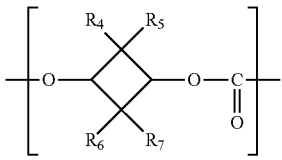
(3)

wherein, $R_4$, $R_5$, $R_6$ and $R_7$ respectively and independently represent a hydrogen atom, halogen atom, alkyl group having 1 to 20 carbon atoms or cycloalkyl group having 3 to 20 carbon atoms.

In a second aspect, the polycarbonate copolymer of the present invention contains as main constituent units thereof a unit (A) represented by the following formula (1-2) and a unit (B) represented by the following formula (3):

[Chem. 13]

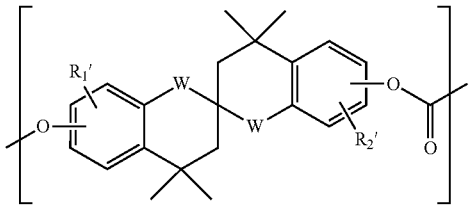
(1-2)

wherein, $R_1'$ and $R_2'$ respectively and independently represent a hydrogen atom, hydrocarbon group having 1 to 10 carbon atoms that may contain an aromatic group or a halogen atom, and W represents a single bond, carbon atom, oxygen atom or sulfur atom;

[Chem. 14]

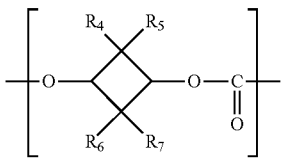
(3)

wherein, $R_3$, $R_4$, $R_5$ and $R_6$ respectively and independently represent a hydrogen atom, halogen atom, alkyl group having 1 to 20 carbon atoms or cycloalkyl group having 3 to 20 carbon atoms.

In a third aspect, the polycarbonate copolymer of the present invention contains as main constituent units thereof a unit (A) represented by the aforementioned formula (1-1), a unit (A) represented by the aforementioned formula (1-2) and a unit (B) represented by formula (3). The descriptions of the aforementioned first aspect and second aspect can be referred to with respect to these constituent units.

Here, the term "main" refers to preferably 70 mol % or more, more preferably 80 mol % or more, even more preferably 90 mol % or more, particularly preferably 95 mol % or more and most preferably 100 mol % of 100 mol % of all carbonate constituent units excluding the terminals.

(Unit (A))

Unit (A) represented by formula (1-1) is such that in formula (1-1) $R_1$ and $R_2$ respectively and independently refer to a hydrogen atom, a hydrocarbon group having 1 to 10 carbon atoms that may contain an aromatic group or a halogen atom. $R_1$ and $R_2$ respectively and independently preferably represent a hydrogen atom or alkyl group having 1 to 6 carbon atoms, more preferably a hydrogen atom or alkyl group having 1 to 3 carbon atoms, and most preferably a hydrogen atom.

In the aforementioned formula (2), $C_m$ represents a cycloalkylene group having 3 to 20 carbon atoms, preferably represents a cycloalkylene group having 3 to 15 carbon atoms, more preferably a cycloalkylene group having 3 to 12 carbon atoms, even more preferably a cycloalkylene group having 4 to 8 carbon atoms and most preferably a cycloalkylene group having 6 carbon atoms.

In the aforementioned formula (2), $R_3$ represents a hydrogen atom, halogen atom, alkyl group having 1 to 20 carbon atoms or cycloalkyl group having 3 to 20 carbon atoms, and n represents an integer of 1 to 10. $R_3$ preferably represents a hydrogen atom or alkyl group having 1 to 6 carbon atoms and more preferably a methyl group, n preferably represents an integer of 1 to 5 and more preferably an integer of 1 to 3.

Unit (A) represented by formula (1-1) is preferably a unit represented by the aforementioned formula (4) and in that formula, $R_8$ and $R_9$ respectively and independently represent a hydrogen atom or alkyl group having 1 to 6 carbon atoms, more preferably a hydrogen atom or alkyl group having 1 to 3 carbon atoms, and most preferably a hydrogen atom.

Examples of divalent phenols from which unit (A) represented by formula (1-1) is derived include 1,1-bis(4-hydroxyphenyl)cyclopentane, 1,1-bis(4-hydroxyphenyl)cyclohexane, 1,1-bis(4-hydroxyphenyl)cyclodecane, 1,1-bis(4-hydroxy-3-methylphenyl)cyclohexane, 1,1-bis(4-hydroxyphenyl)-4-methylcyclohexane, 1,1-bis(4-hydroxyphenyl)-3,3,5-trimethylcyclohexane, 1,1-bis(4-hydroxy-3-methylphenyl)-3,3,5-trimethylcyclohexane, 1,1-bis(4-hydroxyphenyl)-4-isopropylcyclohexane and 1,1-bis(3-cyclohexyl-4-hydroxyphenyl)cyclohexane. The most preferable divalent phenol is 1,1-bis(4-hydroxyphenyl)-3,3,5-trimethylcyclohexane. Two or more types of these divalent phenols may be used in combination.

Unit (A) represented by formula (1-2) is such that in formula (1-2), $R_1$ and $R_2$ respectively and independently represent a hydrogen atom, hydrocarbon group having 1 to 10 carbon atoms that may contain an aromatic group or a halogen atom. Examples of the hydrocarbon group include an alkyl group having 1 to 10 carbon atoms, cycloalkyl group having 5 to 10 carbon atoms, aryl group having 6 to 10 carbon atoms, aralkyl group having 7 to 10 carbon atoms and alkenyl group having 1 to 10 carbon atoms. Examples of the halogen atom include a fluorine atom, chlorine atom and bromine atom. $R_1$ and $R_2$ respectively and independently preferably represent a hydrogen atom or alkyl group having 1 to 6 carbon atoms, more preferably a hydrogen atom or alkyl group having 1 to 3 carbon atoms, and most preferably a hydrogen atom. W represents a single bond, carbon atom, oxygen atom or sulfur atom and more preferably represents a single bond.

The dihydroxy compound from which unit (A) is derived as related to the second aspect is preferably 6,6'-dihydroxy-3,3,3'-tetramethyl-1,1'-spirobiindane or spirobichroman and most preferably 6,6'-dihydroxy-3,3,3',3'-tetramethyl-1,1'-spirobiindane.

(Unit B))

Unit (B) is such that in the aforementioned formula (3). $R_4$, $R_5$, $R_6$ and $R_7$ respectively and independently represent a hydrogen atom, halogen atom, alkyl group having 1 to 20 carbon atoms or cycloalkyl group having 3 to 20 carbon atoms, $R_4$, $R_5$, $R_6$ and $R_7$ respectively and independently preferably represent a hydrogen atom, alkyl group having 1 to 6 carbon atoms or cycloalkyl group having 3 to 6 carbon atoms, and more preferably represent a methyl group.

Examples of dihydroxy compounds from which unit (B) is derived include 2-methyl-1,3-cyclobutanediol, 2,4-dimethyl-1,3-cyclobutanediol, 2,2,4,4-tetramethyl-1,3-cyclobutanediol, 2-ethyl-1,3-cyclobutanediol, 2,4-diethyl-1,3-cyclobutanediol and 2,2,4,4-tetrabutyl-1,3-cyclobutanediol. The most preferable dihydroxy compound is 2,2,4,4-tetramethyl-1,3-cyclobutanediol. Two or more types of these dihydroxy compounds may be used in combination.

The dihydroxy compound from which unit (B) is derived is normally a mixture of cis-trans isomers. Although there are no particular limitations on the ratio thereof, the ratio of the cis isomer is preferably 50% or more, more preferably 60% or more and even more preferably 70% or more. In the case the ratio of the cis isomer is equal to or greater than the aforementioned ratios, impact resistance of the resulting polycarbonate copolymer is favorable and is preferably used in applications requiring impact resistance. According to Japanese Examined Patent Publication No. S39-1546, it is described that, in the case the ratio of the trans isomer is 50% or less, there is less susceptibility to the occurrence of decomposition during molding processing, thereby facilitating the obtaining of superior resin molded articles. The ratio of cis/trans isomers can be calculated by measuring by proton NMR using the JNM-AL400 system manufactured by JEOL Ltd.

In addition, the dihydroxy compound from which unit (B) is derived preferably has a Hazen color number (APHA) when melted in a nitrogen atmosphere at 220° C. of 100 or less, more preferably 80 or less and even more preferably 60 or less. If the Hazen color number is equal to or less than the aforementioned values, the hue of the polymer is favorable and transparency is superior, thereby making this preferable.

Furthermore, diol compounds used to derive other copolymer constituent units may be aliphatic diol compounds or alicyclic diol compounds, and examples thereof include oxyalkylene glycols and diols having a cyclic acetal structure such as the diol compounds described in International Publication No. WO 2004/111106 and International Publication No. WO 2011/021720, diethylene glycol, triethylene glycol, tetraethylene glycol or polyethylene glycol.

Examples of the aforementioned aliphatic diol compounds include 1,3-propanediol, 1,4-butanediol, 1,5-pentanediol, 1,6-hexanediol, 1,8-octanediol, 1,9-nonanediol, 1,10-decanediol, 1,12-dodecanediol, 2-methyl-1,3-propanediol, neopentyl glycol, 3-methyl-1,5-pentanediol, 2-n-butyl-2-ethyl-1,3-propanediol, 2,2-diethyl-1,3-propanediol, 2,4-diethyl-1,5-pentanediol, 1,2-hexane glycol, 1,2-octyl glycol, 2-ethyl-1,3-hexanediol, 2,3-diisobutyl-1,3-propanediol, 2,2-diisoamyl-1,3-propanediol and 2-methyl-2-propyl-1,3-propanediol. Two or more types of these divalent phenols may be used in combination.

Examples of the aforementioned alicyclic diol compounds include cyclohexanedimethanol, tricyclodecanedimedianol, adamantanediol, pentacyclopentadecanemethanol and 3,9-bis(2-hydroxy-1,1-dimethylethyl)-2,4,8,10-tetraoxaspiro[5,5]undecane. Two more types of these divalent phenols may be used in combination.

Examples of the aforementioned oxyalkylene glycols include diethylene glycol, triethylene glycol, tetraethylene glycol and polyethylene glycol. One type of these compounds may be used alone or two or more types may be used in combination.

Examples of the aforementioned diols having a cyclic acetal structure include spiro-glycol and dioxane glycol.

Furthermore, the aforementioned exemplary compounds are merely examples of dihydroxy compounds that can be used as constituent units of the polycarbonate copolymer of the present invention and are not intended to be limited thereto.

(Composition)

The polycarbonate copolymer of the present invention contains a unit (A) and a unit (B) and the molar ratio of unit (A) to unit (B) (A/B) may be 5/95 to 50/50. A molar ratio (A/B) within the range of 5/95 to 50/50 is preferable with respect to heat resistance and weather resistance. The molar ratio (A/B) of unit (A) to unit (B) is preferably 10/80 to 50/50 and more preferably 20/80 to 50/50. In addition, the molar ratio (A/B) of unit (A) to unit (B) is more preferably 10/90 to 40/60 and even more preferably 15/85 to 35/65. If unit (A) is within these ranges, the balance among heat resistance, surface hardness, weather resistance and chemical resistance tends to be preferable. The molar ratio (A/B) can be calculated by measuring proton NMR using the JNM-AL400 system manufactured by JEOL Ltd.

In a third aspect, although there are no particular limitations thereon, the molar ratio between unit (A) represented by formula (1-1) and unit (A) represented by formula (1-2) may be 5/95 to 95/5, 10/90 to 90/10, 20/80 to 80/20, 30/70 to 70/30 or 40/60 to 60/40.

In the case of further copolymerizing an aliphatic dihydroxy compound, alicyclic dihydroxy compound, oxyalkylene glycol or diol having a cyclic acetal structure, there are no particular limitations on the copolymerization ratio of each of these dihydroxy compounds and an arbitrary ratio can be selected. These copolymer units preferably constitute 30 mol % or less, more preferably 20 mol % or less, even more preferably 10 mol % or less and particularly preferably 5% or less based on 100 mol % of all carbonate constituent units excluding terminals.

(Polycarbonate Copolymer Production Method)

The polycarbonate copolymer of the present invention is produced by a known reaction means for producing ordinary polycarbonate resins such as a method in which a carbonate precursor substance such as a carbonic acid diester is reacted with a dihydroxy component. The following provides a brief explanation of a basic means for carrying out these production methods.

A transesterification reaction using a carbonic acid diester for the carbonate precursor substance is carried out by stirring a prescribed ratio of an aromatic dihydroxy component and carbonic acid diester in an inert gas atmosphere while heating followed by distilling off the alcohol or phenol formed. Although differing according to the boiling point of the alcohol or phenol formed, the reaction temperature is normally within the range of 120° C. to 300° C. The reaction is completed while reducing pressure from the outset of the reaction to distill off the alcohol or phenol formed. In addition, an end terminator or antioxidant and the like may be added as necessary.

Examples of carbonic acid diesters used in the aforementioned transesterification reaction include esters of optionally substituted aryl groups and aralkyl groups having 6 to 12 carbon atoms. Specific examples include diphenyl carbonate, ditolyl carbonate, bis(chlorophenyl) carbonate and m-cresyl carbonate. Among these, diphenyl carbonate is particularly preferable. The amount of diphenyl carbonate used is preferably 0.97 mol to 1.10 mol and more preferably 1.00 mol to 1.06 mol to a total of 1 mol of dihydroxy compound.

In addition, a polymerization catalyst can be used to increase the polymerization rate in a melt polymerization method and examples of such polymerization catalysts include alkaline metal compounds, alkaline earth metal compounds, nitrogen-containing compounds and metal compounds.

Organic acid salts, inorganic salts, oxides, hydroxides, hydrides, alkoxides and quaternary ammonium hydroxides, for example, are preferably used for these compounds, and these compounds can be used alone or in combination.

Examples of alkaline metal compounds include sodium hydroxide, potassium hydroxide, cesium hydroxide, lithium hydroxide, sodium bicarbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium benzoate, potassium benzoate, cesium benzoate, lithium benzoate, disodium hydrogen phosphate, dipotassium hydrogen phosphate, dilithium hydrogen phosphate, disodium phenylphosphate, disodium bisphenol A, dipotassium salts, dicesium salts, dilithium salts and sodium salts, potassium salts, cesium salts and lithium salts of phenol.

Examples of alkaline earth metal compounds include magnesium hydroxide, calcium hydroxide, strontium hydroxide, barium hydroxide, magnesium carbonate, calcium carbonate, strontium carbonate, barium carbonate, magnesium diacetate, calcium diacetate, strontium diacetate and barium diacetate.

Examples of nitrogen-containing compounds include quaternary ammonium hydroxides having an alkyl group or aryl group such as tetramethyl ammonium hydroxide, tetraethyl ammonium hydroxide, tetrapropyl ammonium hydroxide, tetrabutyl ammonium hydroxide or trimethylbenzyl ammonium hydroxide. Additional examples include tertiary amines such as triethylamine, dimethylbenzylamine or triphenylamine, and imidazoles such as 2-methylimidazole, 2-phenylimidazole or benzoimidazole. Other examples include bases and basic salts such as ammonia, tetramethyl ammonium borohydride, tetrabutyl ammonium borohydride or tetraphenyl ammonium tetraphenyl borate.

Examples of metal compounds include zinc aluminum compounds, germanium compounds, organic tin compounds, antimony compounds, manganese compounds, titanium compounds and zirconium compounds. One type of these compounds may be used or two or more types may be used in combination.

The amount of these polymerization catalysts used is preferably 0.1 μmol to 500 μmol, more preferably 0.5 μmol to 300 μmol and even more preferably 1 μmol to 100 μmol to 1 mol of dihydroxy component.

In addition, a catalyst deactivator can also be added during the latter stage of the reaction. Although a known catalyst deactivator is effectively used for the catalyst deactivator used, among these, ammonium salts and phosphonium salts of sulfonic acid are preferable. Salts of dodecylbenzenesulfonic acid such as tetrabutylphosphonium dodecylbenzenesulfonate and salts of para-toluenesulfonic acid such as tetrabutylammonium p-toluenesulfonate are particularly preferable.

In addition, examples of esters of sulfonic acid that are used preferably include methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, butyl p-toluenesulfonate, octyl p-toluenesulfonate and phenyl p-toluenesulfonate. Among these, tetrabutylphosphonium dodecylbenzenesulfonate is used most preferably.

The amount of these catalyst deactivators used in the case of using at least one type of polymerization catalyst selected from alkaline metal compounds and/or alkaline metal earth compounds is preferably a ratio of 0.5 mol to 50 mol, more preferably 0.5 mol to 10 mol and even more preferably 0.8 mol to 5 mol per 1 mol of the catalyst.

(Number Average Molecular Weight)

The number average molecular weight (Mn) of the polycarbonate copolymer of the present invention may be 10,000 or more, 15,000 or more, 18,000 or more or 20,000 more and 100,000 or less, 80,000 or less, 50,000 or less, 30,000 or less, 20,000 or less or 18,000 or less. In addition, the weight average molecular weight (Mw) may similarly be 15,000 or more, 20,000 or more, 30.000 or more or 50,000 or more and 200.000 or less, 150,000 or less, 100.000 or less, 80.000 or less, 50,000 or less or 30,000 or less. Moreover, the molecular weight distribution (Mw/Mn) thereof may be 1.5 or more, 1.8 or more, 2.0 or more or 2.3 or more and 3.5 or less, 3.0 or less, 2.5 or less or 2.3 or less. Here, number average molecular weight (Mn) and weight average molecular weight (Mw) are values obtained by gel permeation chromatography (GPC) as polystyrene. More specifically, the following measurement apparatus and measurement conditions are used.

Measurement apparatus: Tosoh HLC-8220GPC
Column: Shodex KF-G+KF-805L×2+KF-800D
Eluent: THF
Temperature: Column constant temperature bath, 40.0° C.
Flow rate: 1.0 mL/min
Concentration: 0.1 wt/vol %
Injection volume: 100 μL
Pretreatment: Filtration with 0.2 μm filter
Detector: Differential refractometer (RI)

(Viscosity Average Molecular Weight)

The viscosity average molecular weight (Mv) of the polycarbonate copolymer of the present invention is preferably 10,000 to 40,000, more preferably 12,000 to 35,000 and even more preferably 15,000 to 30,000. Adequate toughness and impact resistance tend to be obtained in the case viscosity average molecular weight is equal to or greater than the aforementioned lower limit values. In addition, in the case viscosity average molecular weight is equal to or less than the aforementioned upper limit values, versatility tends to be superior since a high molding processing temperature or special molding method is required. Moreover, as a result of lowering melt viscosity, there is less susceptibility to dependence on injection speed, thereby improving yield due to a reduction in external defects and the like.

The viscosity average molecular weight of the polycarbonate copolymer in the present invention is calculated by first determining specific viscosity (rsp) calculated according to the following equation by using an Ostwald viscometer from a solution obtained by dissolving 0.7 g of polycarbonate resin in 100 ml of methylene chloride at 20° C., specific viscosity $(\eta_{SP})=(t-t_0)/t_0$ (wherein, t0 is the falling time of methylene chloride and t is the falling time of the sample solution) followed by calculating viscosity average molecular weight My from the determined specific viscosity $(\eta_{SP})$ according to the equation indicated below.

$\eta_{SP}/c=[\eta]+0.45\times[\eta]^2 c$ (where $[\eta]$ represents limiting viscosity)

$[\eta]=1.23\times10^{-4} Mv^{0.83}$ c=0.7

(Glass Transition Temperature)

The polycarbonate copolymer of the present invention exhibits a single glass transition temperature (Tg) as determined by differential scanning calorimetry (DSC). Tg is preferably 125° C. to 175° C. and more preferably 130° C. to 160° C. In addition, Tg may be 126° C. to 175° C., preferably 128° C. to 170° C. and more preferably 130° C. to 160° C. Heat resistance is adequate if glass transition temperature (Tg) is equal to or greater than the aforementioned lower limit values and molding processability is favorable if Tg is equal to or less than the aforementioned upper limit values.

Tg can be measured at a heating rate of 20° C./min using the Model 2910 DSC manufactured by TA Instruments Inc.

(Specific Gravity)

Specific gravity of the polycarbonate copolymer of the present invention is preferably 1.10 or less, more preferably 1.08 or less and even more preferably 1.06 or less. Specific gravity was measured in compliance with JIS 7112 Plastics—Methods of determining the density and relative density of non-cellular plastics (Method C, sink-float method). A lower specific gravity is preferable from the viewpoint of reducing weight.

(Pencil Hardness)

Pencil hardness of the polycarbonate copolymer of the present invention is preferably HB or harder or F or harder. Pencil hardness is preferably H or harder, and more preferably 2H or harder from the viewpoint of superior scratch resistance. Furthermore, pencil hardness of 411 or harder results in adequate function. Pencil hardness can be increased by increasing the composition ratio of unit (B) based on the total number of carbonate units. In the present invention, pencil hardness refers to the hardness at which a scratch does not remain even if the resin has been scratched with a pencil having a specific pencil hardness (Hi-Uni manufactured by Mitsubishi Pencil Co., Ltd. after having formed the copolymer of the present invention into the form of a sheet, and pencil hardness used in surface hardness testing of a coated film able to be measured in accordance with JIS K-5600 is preferably used as an indicator. Pencil hardness decreases in the order of 9H, 8H, 7H, 6H, 5H, 4H, 31H, 2H, H, F, HB, B, 2B, 3B, 4B, 5B and 6B, with the highest pencil hardness being 9H and the lowest pencil hardness being 6B.

(Chemical Resistance)

The polycarbonate copolymer of the present invention has critical strain at which solvent cracking occurs in a chemical resistance test using regular gasoline of preferably 0.5% or more and more preferably 1.0% or more. If critical strain is equal to or greater than the aforementioned values, resistance to gasoline is satisfactory, thereby making this preferable. The chemical resistance test consists of attaching the test piece (square sheet having a thickness of 1 mm) to a Bergen 1/4 elliptical jig having a different curvature at each section and immersing in regular gasoline followed by measuring strain at the endpoint of crack formation after 1 hour.

(Impact Resistance)

Impact energy of the polycarbonate copolymer of the present invention as determined by a high speed surface impact test in accordance with JIS K7211-2 is preferably 25 J or more and more preferably 30 J or more. Moreover, fracture morphology is preferably that of a ductile fracture. If impact energy is equal to or greater than the aforementioned values, impact resistance is favorable and fracture morphology is that of a ductile fracture, thereby making this preferable.

(Aromatic Monohydroxy Compound Content)

The aromatic monohydroxy compound content of the polycarbonate copolymer of the present invention is preferably 1500 ppm or less, more preferably 1200 ppm or less and even more preferably 1000 ppm or less. The lower the aromatic monohydroxy compound content, the better the color tone of the polycarbonate copolymer, thereby making this preferable. Furthermore, although there are no particular limitations thereon, aromatic monohydroxy compounds are normally contained at a lower limit value of 5 ppm or more.

Components Other than Polycarbonate Copolymer

The polycarbonate copolymer of the present invention can contain known functional agents such as a mold release agent, heat stabilizer, ultraviolet absorber, flow modifier or antistatic agent within a range that does not impair the effects of the present invention.

(i) Mold Release Agent

The polycarbonate copolymer of the present invention may combine the use of a mold release agent within a range that does not impair the effects of the present invention. Examples of mold release agents include fatty acid esters and polyolefin waxes (such as polyethylene wax or 1-algene polymers, and those modified compounds containing functional groups such as nuclear modification compounds can also be used), fluorine compounds (such as fluorine oils represented by polyfluoroalkyl ethers), paraffin wax and beeswax. Among these, fatty acid esters are preferable from the viewpoints of availability, mold releasability and transparency. The ratio at which the mold release agent is contained is preferably 0.001 part by weight to 2 parts by weight, more preferably 0.005 parts by weight to 1 part by weight, even more preferably 0.007 parts by weight to 0.5 parts by weight and particularly preferably 0.01 part by weight to 0.3 parts by weight based on 100 parts by weight of the polycarbonate copolymer. If the content thereof is equal to or greater than the lower limits of the aforementioned ranges, effects improving mold releasability are clearly demonstrated, and in the case of being equal to or less than the upper limits, detrimental effects such as mold soiling during molding are reduced, thereby making this preferable.

The following provides a more detailed description of fatty acid esters used preferably among the aforementioned mold release agents. These fatty acid esters are esters of an aliphatic alcohol and an aliphatic carboxylic acid. The aliphatic alcohol may be a monovalent alcohol or a polyvalent alcohol having a valence of two or more. In addition, the number of carbon atoms of the alcohol is preferably within the range of 3 to 32 and more preferably within the range of 5 to 30. Examples of monovalent alcohols include dodecanol, tetradecanol, hexadecanol, octadecanol, eicosanol, tetracosanol, ceryl alcohol and triacontanol. Examples of polyvalent alcohols include pentaerythritol, dipentaerythritol, tripentaerythritol, polyglycerols (triglycerol to hexaglycerol), ditrimethylolpropane, xylitol, sorbitol and mannitol. The fatty acid ester is more preferably a polyvalent alcohol.

On the other hand, the aliphatic carboxylic acid preferably has 3 to 32 carbon atoms and particularly preferably 10 to 22 carbon atoms. Examples of these aliphatic carboxylic acids include saturated aliphatic carboxylic acids such as decanoic acid, undecanoic acid, dodecanoic acid, tridecanoic acid, tetradecanoic acid, pentadecanoic acid, hexadecanoic acid (palmitic acid), heptadecanoic acid, octadecanoic acid (stearic acid), nonadecanoic acid, icosanoic acid or docosanoic acid (behenic acid), and unsaturated aliphatic carboxylic acids such as palmitoleic acid, oleic acid, linoleic acid, linolenic acid, eicosenoic acid, eicosapentaenoic acid or setoleic acid. Among these, the aliphatic carboxylic acid preferably has 14 to 20 carbon atoms. Among these, saturated aliphatic carboxylic acids are preferable. Since these aliphatic carboxylic acids are normally produced from natural oils and fats such as animal fats and oils (such as beef tallow or pork tallow) or vegetable oils (such as palm oil), these aliphatic carboxylic acids are normally a mixture containing other carboxylic acid components having different numbers of carbon atoms. Thus, in the production of aliphatic carboxylic acids as well, aliphatic carboxylic acids are produced from these natural fats and oils and are in the form of a mixture containing other carboxylic acid components. The acid value in the fatty acid ester is preferably 20 or less (and can substantially be zero). However, in the case of full esters, at least some free fatty acids are contained in order to improve mold releasability, and with respect to this point, the acid value in a full ester is preferably 3 to 15. In addition, the iodine value of the fatty acid ester is preferably 10 or less (and can substantially be zero). These properties can be determined according to the methods described in JIS K 0070.

Although the aforementioned fatty acid ester may be a partial ester or full ester, partial esters are preferable from the viewpoints of better mold releasability and durability. Glycerin monoesters are particularly preferable. Glycerin monoesters are mainly composed of glycerin and monoesters of fatty acids, preferable examples thereof include saturated fatty acids such as stearic acid, palmitic acid, behenic acid, arachinic acid, montanic acid or lauric acid, and unsaturated fatty acids such as oleic acid, linoleic acid or sorbic acid, and those having glycerin monoesters of stearic acid, behenic acid or palmitic acid as main components thereof are particularly preferable. Furthermore, these fatty acids are synthesized from natural fatty acids and are mixtures are previously described. In such cases as well, the ratio of glycerin monoester in the fatty acid ester is preferably 60% by weight or more.

Furthermore, there are cases in which partial esters are inferior to full esters in terms of heat stability. Partial esters contain sodium metal preferably at less than 20 ppm, more preferably less than 5 ppm and even more preferably less than 1 ppm in order to improve the heat stability thereof. Fatty acid partial esters having a sodium metal content of less than 1 ppm can be produced by producing the fatty acid partial ester using an ordinary method followed by purifying by molecular distillation and the like.

More specifically, a method may be employed in which, after removing gas components and low boiling point substances with a spray nozzle type degassing apparatus, polyvalent alcohols such as glycerin are removed under conditions of a distillation temperature of 120° C. to 150° C. and degree of vacuum of 0.01 kPa to 0.03 kPa using a falling-film evaporator followed by further obtaining highly pure fatty acid partial ester as distillate under conditions of a distillation temperature of 160° C. to 230° C. and degree of vacuum of 0.01 Torr to 0.2 Torr using a centrifugal molecular distillation apparatus, thereby making it possible to remove sodium metal as distillation residue. Purity of the resulting distillate can be further increased by repeating molecular distillation to obtain a fatty acid partial ester having an even lower sodium metal content. In addition, it is important to thoroughly clean the inside of the molecular distillation apparatus in advance using a suitable method and prevent entrance of sodium metal components from the external environment by increasing airtightness. These fatty acid esters can be acquired from specialized manufacturers (such as Riken Vitamin Co., Ltd.).

(ii) Phosphorous-Based Stabilizer

Various types of phosphorous-based stabilizers are preferably further incorporated in the polycarbonate copolymer of the present invention primarily for the purpose of improving heat stability during molding processing thereof. Examples of these phosphorous-based stabilizers include phosphorous acid, phosphoric acid, phosphonous acid, phosphonic acid and esters thereof. These phosphorous-based stabilizers also include tertiary phosphines.

Specific examples of phosphite compounds triphenyl phosphite, tris(nonylphenyl) phosphite tridecyl phosphite, trioctyl phosphite, trioctadecyl phosphite, didecyl monophenyl phosphite, dioctyl monophenyl phosphate, diisopropyl monophenyl phosphite, monobutyl diphenyl phosphite, monodecyl diphenyl phosphite, monooctyl diphenyl phosphite, 2,2-methylenebis(4,6-di-tert-butylphenyl) octyl phosphite, tris(diethylphenyl) phosphite, tris(diisopropylphenyl) phosphite, tris(di-n-butylphenyl) phosphite, tris(2,4-di-tert-butylphenyl) phosphite, tris(2,6-di-tert-butylphenyl) phosphite, distearyl pentaerythritol diphosphite, bis(2,4-di-tert-butylphenyl) pentaerythritol diphosphite, bis(2,6-di-tert-butyl-4-methylphenyl) pentaerythritol diphosphite, bis(2,6-di-tert-butyl-4-ethylphenyl) pentaerythritol diphosphite, phenyl bisphenol A pentaerythritol diphosphite, bis(nonylphenyl) pentaerythritol diphosphite and dicyclohexyl pentaerythritol diphosphite.

Moreover, compounds that react with divalent phenols and have a cyclic structure can also be used as other phosphite compounds. Examples thereof include 2,2'-methylenebis(4,6-di-tert-butylphenyl) (2,4-di-tert-butylphenyl) phosphite, 2,2'-methylenebis(4,6-di-tert-butylphenyl) (2-tert-butyl-4-methylphenyl) phosphite, 2,2'-methylenebis (4-methyl-6-tert-butylphenyl) (2-tert-butyl-4-methylphenyl) phosphite and 2,2'-ethylidenebis(4-methyl-6-tert-butylphenyl) (2-tert-butyl-4-methylphenyl) phosphite.

Examples of phosphate compounds include tributyl phosphate, trimethyl phosphate, tricresyl phosphate, triphenyl phosphate, trichlorophenyl phosphate, triethyl phosphate, diphenyl cresyl phosphate, diphenyl monoorthoxenyl phosphate, tributoxyethyl phosphate, dibutyl phosphate, dioctyl phosphate and diisopropyl phosphate, and triphenyl phosphate and trimethyl phosphate are preferable.

Examples of phosphonite compounds include tetrakis(2, 4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, bis(2,6-di-n-butylphenyl)-3-phenyl-phenyl phosphonite, bis(2,6-di-tert-butylphenyl)-4-phenyl-phenyl phosphonite and bis(2,6-di-tert-butylphenyl)-3-phenyl-phenyl phosphonite, tetrakis(di-tert-butylphenyl)-biphenylene diphosphonite and bis(di-tert-butylphenyl)-phenyl-phenyl phosphonite are preferable, and tetrakis(2,4-di-tert-butylphenyl)-biphenylene diphosphonite and bis(2,4-di-tert-butylphenyl)-phenyl-phenyl phosphonite are more preferable. These phosphonite compounds can be used in combination with phosphite compounds having aryl groups substituted with two or more of the aforementioned alkyl group, and are thereby preferable.

Examples of phosphonate compounds include dimethyl benzenephosphonate, diethyl benzenephosphonate and dipropyl benzenephosphonate.

Examples of tertiary phosphines include triethylphosphine, tripropylphosphine, tributylphosphine, trioctylphosphine, triamylphosphine, dimethylphenylphosphine, dibutylphenylphosphine, diphenylmethylphosphine, diphenyloctylphosphine, triphenylphosphine, tri-p-tolylphosphine, trinaphthylphosphine and diphenylbenzylphosphine. The tertiary phosphine is particularly preferably triphenylphosphine.

One type of the aforementioned phosphorous-based stabilizers can be used alone or two or more types can be used as a mixture. Among the aforementioned phosphorous-based stabilizers, phosphite compounds or phosphonite compounds are preferable. Tris(2,4-di-tert-butylphenyl) phosphite, tetrakis(2,4-di-tert-butylphenyl)-4,4'-biphenylene diphosphonite and bis(2,4-di-tert-butylphenyl)-phenyl-phenyl phosphonite are particularly preferable. The combined used of these compounds with phosphate compounds is also a preferable aspect.

(iii) Hindered Phenol-Based Stabilizer (Antioxidant)

A hindered phenol-based stabilizer can be incorporated in the polycarbonate copolymer of the present invention for the purpose of improving heat stability during molding processing and heat aging resistance. Examples of these hindered phenol-based stabilizers include α-tocopherol, butylhydroxytoluene, sinapyl alcohol, vitamin E, n-octadecyl-β-(4'-hydroxy-3',5'-di-tert-butylphenyl) propionate, 2-tert-butyl-6-(3'-tert-butyl-5'-ethyl-hydroxybenzyl)-4-methylphenyl acrylate, 2,6-di-tert-butyl-4-(N,N-dimethylaminomethyl) phenol, 3,5-di-tert-butyl-4-hydroxybenzylphosphonate diethyl ester, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylenebis(6-ca-methyl-benzyl-p-cresol), 2,2'-ethylidenebis(4,6-di-tert-butylphenol), 2,2'-butylidenebis(4-methyl-6-tert-butylphenol), 4,4'-butylidenebis(3-methyl-6-tert-butylphenol), triethylene glycol-N-bis-3-(3-tert-butyl-4-hydroxy-5-methylphenyl) propionate, 1,6-hexandiol bis[3-(3,5-di-tert-butyl-4-hydroxyphenyl) propionate], bis[2-tert-butyl-4-methyl-6-(3-tert-butyl-5-methyl-2-hydroxybenzyl)phenyl]terephthalate, 3,9-bis {2-[3-(3-tert-butyl-4-hydroxy-5-methylphenyl)propionyloxy]-1,1-dimethylethyl}-2,4,8,10-tetraoxaspiro[5,5] undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl) sulfide, 4,4'-dithiobis(2,6-di-tert-butyl phenol), 4,4'-trithiobis(2,6-di-tert-butylphenol), 2,2-thiodiethylenebis[3-(3,5-di-tert-butyl-4-hydroxyphenyl) propionate], 2,4-bis(n-octylthio)-6-(4-hydroxy-3',5'-di-tert-butylanilino)-1,3,5-triazine, N,N'-hexamethylenebis(3,5-di-tert-butyl-4-hydroxyhydrocinnamide), N,N'-bis[3-(3,5-di-tert-butyl-4-hydroxyphenyl)propionyl]hydrazine, 1,1,3-tris(2-methyl-4-hydroxy-5-tert-butylphenyl) butane, 1,3,5-trimethyl-2,4,6-tris(3,5-di-tert-butyl-4-hydroxybenzyl) benzene, tris(3,5-di-tert-butyl-4-hydroxyphenyl) isocyanurate, tris(3,5-di-tert-butyl-4-hydroxybenzyl) isocyanurate, 1,3,5-tris(4-tert-butyl-3-hydroxy-2,6-dimethylbenzyl) isocyanurate, 1,3,5-tris2[3-(3, 5-di-tert-butyl-4-hydroxyphenyl)propionyloxy]ethyl isocyanurate and tetrakis[methylene-3-(3',5'-di-tert-butyl-4-hydroxyphenyl) propionate]. All of these compounds are readily available. The aforementioned hindered phenol-based antioxidants can be used alone or two or more types can be used in combination.

The amount of the aforementioned (ii) phosphorous-based stabilizer and/or (iii) hindered phenol-based antioxidant is preferably 0.0001 part by weight to 1 part by weight, more preferably 0.001 part by weight to 0.5 parts by weight and even more preferably 0.005 parts by weight to 0.1 part by weight based on 100 parts by weight of the polycarbonate copolymer. Favorable stabilizing effects can be obtained in the case the stabilizer is equal to or greater than the aforementioned ranges, and there is less susceptibility to decreases in physical properties of the materials and mold soiling during molding in the case the stabilizer is equal to or less than the aforementioned ranges.

Antioxidants other than the aforementioned hindered phenol-based antioxidants can also be suitably used in the polycarbonate copolymer of the present invention. Examples of these other antioxidants include pentaerythritol tetrakis(3-mercaptopropionate), pentaerythritol tetrakis(3-laurylthiopropionate) and glycerol-3-stearylthiopropionate. The amount of these other antioxidants used is preferably 0.001 part by weight to 0.05 parts by weight based on 100 parts by weight of the polycarbonate copolymer.

(iv) Ultraviolet Absorber

The polycarbonate copolymer used in the present invention can contain an ultraviolet absorber. Specific examples of benzophenone-based ultraviolet absorbers of the present invention include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydride benzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodium sulfoxybenzophenone, bis(5-benzoyl-4-hydroxy-2-methoxyphenyl) methane, 2-hydroxy-4-n-dodecyloxybenzophenone and 2-hydroxy-4-methoxy-2'-carboxybenzophenone.

Specific examples of benzotriazole-based ultraviolet absorbers include 2-(2-hydroxy-5-methylphenyl) benzotriazole, 2-(2-hydroxy-5-tert-octylphenyl) benzotriazole, 2-(2-hydroxy-3,5-dicumylphenyl)phenyl benzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzotriazol-2-yl)phenol], 2-(2-hydroxy-3,5-di-tert-butylphenyl) benzotriazole, 2-(2-hydroxy-3,5-di-tert-butylphenyl)-5-chlorobenzotriazole, 2-(2-hydroxy-3,5-di-tert-amylphenyl) benzotriazole, 2-(2-hydroxy-5-tert-octylphenyl) benzotriazole, 2-(2-hydroxy-5-tert-butylphenyl) benzotriazole, 2-(2-hydroxy-4-octoxyphenyl) benzotriazole, 2,2'-methylenebis (4-cumyl-6-benzotriazolephenyl), 2,2'-p-phenylenebis(1,3-benzoxazin-4-one) and 2-[2-hydroxy-3-(3,4,5,6-tetrahydrophthalimidomethyl)-5-methylphenyl] benzotriazole, as well as polymers having a 2-hydroxyphenyl-2H-benzotriazole backbone such as copolymers of 2-(2'-hydroxy-5-methacryloxyethylphenyl)-2H-benzotriazole and vinyl-based monomers capable of copolymerizing therewith or copolymers of 2-(2'-hydroxy-5-acryloxyethylphenyl)-2H-benzotriazole and vinyl-based monomers capable copolymerizing therewith.

Specific examples of hydroxyphenyltriazine-based ultraviolet absorbers include 2-(4,6-diphenyl-1,3,5-triazin-2-yl)-5-hexyloxyphenol, 2-(4,6-diphenyl-1,3,5-triazin-2-yl)-5-methyloxyphenol, 2-(4,6-diphenyl-1,3,5-triazin-2-yl)-5-ethyloxyphenol, 2-(4,6-diphenyl-1,3,5-triazin-2-yl)-5-propyloxyphenol and 2-(4,6-diphenyl-1,3,5-triazin-2-yl)-5-butyloxyphenol. Additional examples include compounds in which the phenyl group of the aforementioned exemplary compounds is a 2,4-dimethylphenyl group such as 2-(4,6-bis(2,4-diethylphenyl)-1,3,5-triazin-2-yl)-5-hexyloxyphenol.

Specific examples of cyclic imino ester-based ultraviolet absorbers include 2,2'-p-phenylenebis(3,1-benoxadin-4-one), 2,2'-(4,4'-diphenylene)bis(3,1-benzoxazin-4-one) and 2,2'-(2,6-naphthalene)bis(3,1-benzoxazin-4-one).

In addition, specific examples of cyanoacrylate-based ultraviolet absorbers include 1,3-bis[(2'-cyano-3',3'-diphenylacryloyl)oxy]-2,2-bis[(2-cyano-3,3-diphenylacryloyi) oxy]methyl) propane and 1,3-bis[(2-cyano-3,3-diphenylacryloyl)oxy] benzene.

Moreover, the aforementioned ultraviolet absorber may be a polymer type of ultraviolet absorber obtained by copolymerizing an ultraviolet absorbing monomer and/or photostabilizing monomer having a hindered amine structure with a monomer such as alkyl (meth)acrylate. Preferable examples of the aforementioned ultraviolet absorbing monomer include compounds having a benzotriazole backbone, benzophenone backbone, triazine backbone, cyclic imino ester background or cyanoacrylate backbone in an ester substituent of a (meth)acrylic ester.

Among the aforementioned ultraviolet absorbers, benzotriazole-based and hydroxyphenyltriazine-based ultraviolet absorbers are preferable from the viewpoint of ultraviolet absorbance while cyclic imino ester-based and cyanoacrylate-based ultraviolet absorbers are preferable from the viewpoint of heat resistance and hue. The aforementioned ultraviolet absorbers may be used alone, or two or more types may be used as a mixture.

The content of ultraviolet absorber is 0.01 part by weight to 2 parts by weight, preferably 0.03 parts by weight to 2 parts by weight, more preferably 0.04 parts by weight to 1 part by weight and even more preferably 0.05 parts by weight to 0.5 parts by weight based on 100 parts by weight of the polycarbonate copolymer.

(v) Flow Modifier

The polycarbonate copolymer of the present invention can contain a flow modifier within a range that does not impair the effects of the present invention. Preferable examples of this flow modifier include styrene-based oligomers, polycarbonate oligomers (including highly branched, hyper-branched and cyclic oligomer types), polyalkylene terephthalate oligomers (including highly branched, hyper-branched and cyclic oligomer types), highly branched and hyper-branched aliphatic polyester oligomers, terpene resin and polycaprolactone. These flow modifiers are used at preferably 0.1 part by weight to 30 parts by weight, more preferably 1 part by weight to 20 parts by weight and even more preferably at 2 parts by weight to 15 parts by weight based on 100 parts by weight of the polycarbonate copolymer. The flow modifier is more preferably polycaprolactone and the composition ratio is 2 parts by weight to 7 parts by weight of polycaprolactone to 100 parts by weight of the polycarbonate copolymer. The molecular weight of the polycaprolactone expressed as number average molecular weight is 1,000 to 70.000, preferably 1,500 to 40,000, more preferably 2,000 to 30,000 and even more preferably 2,500 to 15,000.

(vi) Antistatic Agent

The polycarbonate copolymer of the present invention can incorporate an antistatic agent primarily for the purpose of improving antistatic properties. Phosphonium sulfonates, phosphites and caprolactone-based polymers can be used for the antistatic agent and phosphonium sulfonates are used preferably. Specific examples of phosphonium sulfonates include tetrabutylphosphonium dodecyl sulfonate, tetrabutylphosphonium dodecyl benzenesulfonate, tributyloctylphosphonium dodecyl benzenesulfonate, tetraoctylphosphonium dodecyl benzenesulfonate, tetraethylphosphonium octadecyl benzenesulfonate, tributylmethylphosphonium dibutyl benzenesulfonate, triphenylphosphonium dibutyl naphthylsulfonate and trioctylmethylphosphonium diisopropyl naphthylsulfonate. Among these, tetrabutylphosphonium dodecyl benzenesulfonate is preferable from the viewpoints of compatibility with polycarbonate and availability. The amount of antistatic agent used is preferably 0.1 part by weight to 5.0 parts by weight, more preferably 0.2 parts by weight to 3.0 parts by weight, even more preferably 0.3 parts by weight to 2.0 parts by weight and particularly preferably 0.5 parts by weight to 1.8 parts by weight based on 100 parts by weight of the polycarbonate copolymer. The effect of preventing antistatic buildup is obtained if the amount used is equal to or greater than 0.1 part by weight, transparency and mechanical strength are superior and there is less susceptibility to the occurrence of external defects by eliminating the occurrence of silver streaks and separation on the surface of molded articles if the amount used is equal to or less than 5.0 parts by weight.

The polycarbonate copolymer of the present invention can also contain various types of additives such as a bluing agent, fluorescent dye, flame retardant or dyeing pigment. These additives can be suitably selected and contained within a range that does not impair the effects of the present invention.

The bluing agent is preferably contained at 0.05 ppm (weight ratio) to 3.0 ppm in the polycarbonate copolymer. Typical examples of bluing agents include Macrolex Violet B and Macrolex Blue RR manufactured by Bayer Inc. and Polysynthren Blue RLS manufactured by Clariant AG.

Examples of fluorescent dyes (including fluorescent whiteners) include coumarin-based florescent dyes, benzopyran-based florescent dyes, perylene-based fluorescent dyes, anthraquinone-based fluorescent dyes, thioindigo-based fluorescent dyes, xanthene-based fluorescent dyes, xanthone-based fluorescent dyes, thioxanthene-based fluorescent dyes, thioxanthone-based fluorescent dyes, thiazine-based fluorescent dyes and diamino-stilbene-based fluorescent dyes. The incorporated amount of the fluorescent dye (including fluorescent whitener) is preferably 0.0001 part by weight to 0.1 part by weight based on 100 parts by weight of the polycarbonate copolymer.

Examples of flame retardants include metal sulfonate-based flame retardants, halogen-containing compound-based flame retardants, phosphorous-containing compound-based flame retardants and silicon-containing compound-based flame retardants. Among these, metal sulfonate-based flame retardants are preferable. Normally, the amount of flame retardant incorporated is preferably within the range of 0.01 part by weight to 1 part by weight, and more preferably within the range of 0.05 parts by weight to 1 part by weight based on 100 parts by weight of the polycarbonate copolymer.

The polycarbonate copolymer of the present invention may also suitably contain other components in addition to those previously described provided those components do not remarkably impair the effects of the present invention. Examples of those other components include resins other than the polycarbonate copolymer. Furthermore, one type of other component may be contained or two or more types may be contained at an arbitrary combination and ratio. Examples of other resins include thermoplastic polyester resins such as polyethylene terephthalate (PET) resin, polytrimethylene terephthalate (PTT) resin or polybutylene terephthalate (PBT) resin, styrene-based resins such as polystyrene (PS) resin, high impact polystyrene (HIPS) resin, acrylonitrile-styrene copolymer (AS resin), acrylonitrile-butadiene-styrene copolymer (ABS resin) or acrylonitrile-styrene-acrylic rubber copolymer (ASA resin), polyolefin resins such as polyethylene (PE) resin, polypropylene (PP) resin, cyclic olefin (COP) resin or cyclic olefin copolymer (COP resin), polyamide (PA) resin, polyimide (PI) resin, polyether imide (PEI) resin, polyurethane (PU) resin, polyphenylene ether (PPE) resin, polyphenylene sulfide (PPS) resin, polysulfone (PSU) resin and polymethacrylate (PMMA) resin.

There are no particular limitations on the method used to incorporate an additive and the like in the polycarbonate copolymer of the present invention and a known method can be used. An example of the most commonly used method consists of preliminarily mixing the polycarbonate copolymer and additive, followed by loading into an extruder to carry out melting and kneading, cooling the extruded thread and cutting the thread with a pelletizer to produce a pellet-shaped molded material.

Although a single screw extruder or twin screw extruder can be used for the extruder in the aforementioned method, a twin screw extruder is preferable from the viewpoints of productivity and kneadability. Typical examples of twin screw extruders include the ZSK (trade name, Werner & Pfleiderer GmbH), TEX (trade name, The Japan Steel Works, LTD.) TEM (trade name. Toshiba Machine Co., Ltd.) and KTX (trade name. Kobe Steel Ltd.). An extruder having a vent capable of removing moisture present in the raw material along with volatile gas generated from the molten kneaded resin can be used preferably for the extruder. A vacuum pump is preferably installed for efficiently discharging generated moisture and volatile gas from the vent outside the extruder. In addition, a screen for removing foreign matter and the like contaminating the extrusion raw materials can be installed in the zone prior to the extruder dicing unit to enable foreign matter to be removed from the resin composition. Examples of this screen include a metal mesh, screen changer and sintered metal plate (such as a disk filter).

Moreover, although the additive can be supplied independently to the extruder, it is preferably preliminarily mixed with the resin raw material as previously described. Examples of premixing means include a Nauta mixer, V-shaped blender, Henschel mixer, mechanochemical device and extrusion mixer. A more preferable method consists of preparing a master agent by, for example, mixing a portion of the raw material resin and additive with high-speed agitator such as Henschel mixer, followed by mixing the master agent with the remainder of the resin raw material with non-high-speed agitator in the manner of a Nauta mixer.

The polycarbonate resin composition extruded from the extruder is either cut directly to form pellets or formed into a strand followed by cutting the strand with a pelletizer to form pellets. It is preferable to ensure that the atmosphere surrounding the extruder is clean in case it is necessary to reduce the effects of external dust and the like. Moreover, it is preferable to narrow pellet shape distribution, further reduce cutting errors, further reduce the amount of fine powder generated during transport and reduce the number of air bubbles (vacuum bubbles) generated within the strands or pellets using various methods previously proposed for polycarbonate resins used for optical disks in the production of pellets. Examples of means used to reduce the number of cutting errors include thread temperature control when cutting with a pelletizer, blowing in ionized air during cutting, optimizing the rake angle of the pelletizer and suitably incorporating a mold release agent, while examples of methods for reducing cutting errors include separating the pellets from the water and erroneously cut pellets by filtering the mixture of cut pellets and water. An example of a measurement method is disclosed in Japanese Unexamined Patent Publication No. 2003-200421. The number of molding cycles can be increased, and the ratio of silver streaks and other defects can be reduced by using these methods.

The number of erroneously cut pellets among the molded materials (pellets) is preferably 10 ppm or less and more preferably 5 ppm or less. Here, erroneously cut pellets refer to particulate matter finer than the pellets of a desired size that passes through a JIS standard sieve having an opening size of 1.0 mm. Although the shape of the pellets can adopt an ordinary shape such as a cylindrical column, quadrangular column or sphere, a cylindrical column (including an elliptical column) is more preferable and the diameter of the cylindrical column is preferably 1.5 mm to 4 mm and more preferably 2 mm to 3.5 mm. The ratio of the short axis to the long axis in an elliptical column is preferably 60% or more and more preferably 65% or more. On the other hand, the length of a cylindrical column is preferably 2 mm to 4 mm and more preferably 2.5 mm to 3.5 mm.

Polycarbonate Resin Molded Article

There are no particular limitations on the method used to produce a molded article comprised of the polycarbonate copolymer or resin composition of the present invention, and a molding method commonly employed for polycarbonate resin can be arbitrarily employed. Examples thereof include injection molding, ultra-high-speed injection molding, injection compression molding, two-color molding, gas assist and other blow molding, molding using an insulated mold, molding using a rapid heating mold, foam molding (including supercritical fluids), insert molding, in-mold coating (IMC) molding, extrusion molding, sheet molding, thermoforming, rotational molding, laminate molding and press molding. In addition, molding methods using a hot runner system can also be used.

In addition, the polycarbonate copolymer or resin composition of the present invention allows the obtaining of a molded article in the form of a sheet or film by using a method such as melt extrusion or solution casting (casting). For example, a method is used in which a fixed amount of the polycarbonate copolymer or resin composition is supplied to an extruder where it is heated and melted after which the molten resin is extruded in the form of a sheet from the end of a T-die onto a mirrored roller, taken up while cooling with multiple rollers, and either cut to a suitable size or wound up at the point it has solidified. A specific example of a method used for solution casting consists of casting a solution obtained by dissolving the polycarbonate copolymer or resin composition in methylene chloride (concentration: 5% to 40%) from a T-die on a mirror-polished stainless steel sheet and separating the sheet while passing through an oven the temperature of which is controlled in stages followed by cooling and winding.

Moreover, the polycarbonate copolymer or resin composition of the present invention can be molded into the form of a laminate. An arbitrary method may be used to produce the laminate and thermocompression bonding or co-extrusion is particularly preferable. Although any arbitrary method can be used for thermocompression bonding, a method consisting of thermocompression bonding a sheet of the polycarbonate copolymer or resin composition with a laminator or press, or a method consisting of thermocompression bonding immediately after extrusion, for example, is preferably used, and a method consisting of continuous thermocompression bonding of the sheet immediately after extrusion is industrially advantageous.

Automobile Interior Parts and Automobile Exterior Parts

Since the polycarbonate copolymer or resin composition of the present invention demonstrates superior surface hardness, heat resistance, weather resistance and solvent resistance while also having low specific gravity, it can be preferably applied to automobile interior parts such as instrument panels, center console panels, car navigation components, car audio-visual components, automobile computer components, display meter covers, meter dials, various switches, display front panels, heater control panels, instrument panels, center clusters, center panels, room lamp lenses, head-up displays and various other display devices, protective parts and translucent parts, as well as automobile exterior parts such as headlamp lenses, back door panels, door handles, emblems, glazing, fenders, bumpers, fascia, door panels, side garnish, pillars, radiator grilles, side protectors, side moldings, rear protectors, rear moldings, various spoilers, hoods, roof panels, trunk lids, detachable tops, window reflectors, mirror housings or outer door handles.

EXAMPLES

Although the following provides a more detailed explanation of the present invention through examples thereof, the present invention is not limited to these examples. The following methods were used to measure various properties in the following examples and comparative examples.

(1) Cis-Trans Ratio (NMR)

Cis-trans isomer ratio (molar ratio) was calculated by measuring by proton NMR using the JNM-AL400 system manufactured by JEOL Ltd.

Sample: 50 g
Solvent: Heavy DMSO, 0.6 mL
Integration number: 512 times (2) Hazen Color Number (APHA)

15 g of sample were weighed in a test tube and placed in an aluminum block bath heater heated to 220° C. in a nitrogen atmosphere. After 15 minutes, the Hazen color number (APHA) of the molten sample was measured with the TZ6000 color difference meter manufactured by JEOL Ltd.

(3) Polymer Composition Ratio (NMR)

Polymer composition ratio (molar ratio) was calculated by measuring by proton NMR using the JNM-AL400 system manufactured by JEOL Ltd.

Amount of polymer: 40 mg
Solvent: Heavy chloroform (containing 0.05% TMS), 0.6 mL
Integration number: 256 times (4) Viscosity Average Molecular Weight The viscosity average molecular weight of the resin composition was measured according to the method indicated below. Specific viscosity ($\eta_{SP}$) was measured from a solution obtained by dissolving 0.7 g of the polycarbonate copolymer in 100 ml of methylene chloride at a solution temperature of 20° C. My as calculated according to the following equation was then used as the viscosity average molecular weight.

$$\eta_{SP}/c=[\eta]+0.45\times[\eta]^2 c$$

$$[\eta]=1.23\times10^{-4}Mv^{0.83}$$

$\eta_{SP}$=specific viscosity
$\eta$=limiting viscosity
c=0.7
Mv=viscosity average molecular weight (5) Glass Transition Temperature The glass transition temperature of the resin composition was measured under conditions of a heating rate of 20° C./min in a nitrogen atmosphere (nitrogen flow rate: 40 ml/min) in accordance with JIS K7121 using the Model 2910 Thermal Analysis System manufactured by TA Instruments Inc.

(6) Specific Gravity

Specific gravity was measured by cutting a three-stage plate (portion having thickness of 2 mm) to a size measuring 400 mm×100 mm and measuring according to the method described in JIS 7112 (sink-float method).

(7) Surface Hardness

Surface hardness was measured using a three-stage plate (portion having a thickness of 2 mm) in compliance with JIS K 5600.

Load: 750 g
Measuring speed: 50 mm/min
Measuring distance: 7 mm
Pencil: Hi-Uni, Mitsubishi Pencil Co., Ltd.

(8) Chemical Resistance Test

The resin composition was molded into a molded sheet measuring 100 mm×100 mm×1 mm with an injection molding machine (EC100 NII-2Y manufactured by Toshiba Machine Co., Ltd.). After allowing to stand for 24 hours at 120° C., the molded sheet was allowed to further stand for 24 hours in environment at 23° C. and 50% RH. Subsequently, the test piece was attached to a Bergen 1/4 elliptical jig and immersed in regular gasoline for 1 hour, followed by measuring strain at the endpoint of crack formation which was considered to be the critical strain.

(9) Weather Resistance Test

A three-stage plate (portion having thickness of 2 mm) was tested under conditions of 63° C. and 50% relative humidity using the Suga Xenon Weather Meter manufactured by Suga Test Instruments Co., Ltd. followed by measuring the change in hue after 1000 hours with the CE-7000A Integrating Sphere Spectrophotometer manufactured by X-Rite, Inc. and calculating the color difference (ΔE CIE L*a*b*).

(10) Impact Resistance Test

The resin composition was molded into a three-stage plate having a width of 50 mm, length of 90 mm and thicknesses from the gate side of 3 mm (length: 20 mm), 2 mm (length: 45 mm) and 1 mm (length: 25 mm) at a holding time of 20 seconds and cooling time of 20 seconds under conditions of a cylinder temperature of 300° C. and mold temperature of 80° C. with an injection molding machine (J-75E3 manufactured by Japan Steel Works, Ltd. Testing was carried out under the following conditions using the HTM-1 Hydroshot manufactured by Shimadzu Corp., followed by visual observation of impact energy and post-testing appearance.

Testing speed: 7 nm/sec
Strike core diameter: Radius 6.4 mm, hemispheric
Pedestal: Radius 12.8 mm, circular
Testing location: 2 mm thick portion of test piece

(11) Phenol Content of Polycarbonate Pellets

After dissolving 1.25 g of polycarbonate pellets in 7 mL of methylene chloride, acetone was added to bring to a total volume of 25 ml to carry out re-precipitation treatment. Next, the treatment liquid was filtered with a 0.2 pun disk filter and quantified by liquid chromatography.

(12) Number Average Molecular Weight and Molecular Weight Distribution

Number average molecular weight (Mn) and molecular weight distribution (Mw/Mn) indicate values obtained by GPC as polystyrene and were determined by employing the following measurement apparatus and measurement conditions.

Measuring instrument: HLC-8220GPC, Tosoh Corp.
Column: Shodex KF-G+KF-805L×2+KF-800D
Eluent: THF
Temperature: Column constant temperature bath, 40.0° C.
Flow rate: 1.0 mL/min
Concentration: 0.1 wt/vol %
Injection volume: 100 μL
Pretreatment: Filtered with 0.2 μm filter
Detector: Differential refractometer (RI)

Example 1

383 parts of 1,1-bis(4-hydroxyphenyl)-3,3,5-trimethylcyclohexane (abbreviated as BPTMC, Honshu Chemical Industry Co., Ltd.), 1600 parts of TMCB (Tokyo Chemical Industry Co., Ltd., cis isomer ratio: 60%. APHA: 80), 2641 parts of diphenyl carbonate (abbreviated as DPC), 0.33 parts of tetramethyl ammonium hydroxide and 0.025 parts of sodium hydroxide were melted by heating to 180° C. in a nitrogen atmosphere. Subsequently, the temperature was increased to 240° C. over the course of 2 hours and pressure inside the reactor was decreased from 101.3 kPa to 13.4 kPa over the course of 40 minutes while distilling off the by-product phenol. Continuing, a transesterification reaction was carried out for 80 minutes while holding the pressure inside the reactor to 13.3 kPa and further distilling off the phenol. The internal pressure was further reduced from 13.3 kPa to 2 kPa in terms of absolute pressure to remove the distilled phenol outside the system. The internal pressure was reduced from 13.3 kPa to 2 kPa in terms of absolute pressure and the temperature was further raised to 260° C. to remove the distilled phenol outside the system. The degree of vacuum was adjusted to 13.4 kPa over the course of 1 hour. Subsequently, the degree of vacuum was made to be 133 Pa or less over the course of 1 hour. Moreover, after the internal pressure reached 0.3 Pa or less, internal pressure was maintained and a polycondensation reaction was carried out. The final temperature inside the reactor was 260° C. The polycondensation reaction was terminated when a predetermined prescribed agitation power was reached.

Next, while still in the molten state, twice the catalytic amount (molar ratio) of tetrabutylphosphonium dodecylbenzenesulfonate was added as catalyst neutralizer and the reaction was continued for 10 minutes at 260° C. and 10 Torr or lower, followed by pumping the resulting polymer to a vented twin-screw extruder (KTX-46, Kobe Steel Ltd.) with a gear pump. 0.1 parts by weight of Rikester EW400 as mold release agent (pentaerythritol tetrastearate, Riken Vitamin Co., Ltd.), 0.05 parts of Hostanox P-EPQ as phosphorous-based antioxidant (tetrakis(2,4-tert-butylphenyl)-4,4'-biphenylene phosphonite, Clariant AG) and 0.03 parts of Irganox 1076 as hindered phenol-based antioxidant (3-[3,5-di-tert-butyl-4-hydroxyphenyl]octadecyl propionate, BASF SE) were added to 100 parts of polymer at an intermediate location of the extruder, melting, kneading and extruding while degassing at an inlet barrel temperature of 230° C., outlet barrel temperature of 280° C. and polymer outlet temperature of 295° C., extruding from the outlet of the twin-screw extruder into a strand and cooling and solidifying with water, followed by forming into pellets with a rotary cutter to obtain polycarbonate pellets. The phenol content in the polycarbonate pellets was 325 ppm. The results of various evaluations using the pellets are shown in Table 1.

Example 2

The same procedure as Example 1 was carried out, except for using 776 parts of BPTMC and 1442 parts of TMCB (Tokyo Chemical Industry Co., Ltd., cis isomer ratio: 80%, APHA: 70), and the results are shown in Table 1.

Example 3

The same procedure as Example 1 was carried out, except for using 1914 parts of BPTMC and 889 parts of TMCB (Tokyo Chemical Industry Co., Ltd., cis isomer ratio: 60%, APHA: 80), and the results are shown in Table 1.

Example 4

The same procedure as Example 1 was carried out, except for changing BPTMC to 991 parts of 1,1-bis(4-hydroxyphenyl)cyclohexane (abbreviated as BPZ, Honshu Chemical Industry Co., Ltd.) and 1245 parts of TMCB (Tokyo Chemical Industry Co., Ltd., cis isomer ratio: 60%, API-A: 80), and the results are shown in Table 1.

Example 5

The same procedure as Example 1 was carried out, except for changing BPTMC to 1825 parts of 1,1-bis(4-hydroxy-3-methylphenyl)cyclohexane (abbreviated as BPOCZ, Honshu Chemical Industry Co., Ltd.) and 889 parts of TMCB (Tokyo Chemical Industry Co., Ltd., cis isomer ratio: 60%, APHA: 80), and the results are shown in Table 1.

Example 6

The same procedure as Example 1 was carried out, except for changing BPTMC to 835 parts of 1,1-bis(4-hydroxy-3-methylphenyl)-3,3,5-cyclohexane (abbreviated as BPOCTMC, Honshu Chemical Industry Co., Ltd.) and 1422 parts of TMCB (Tokyo Chemical Industry Co., Ltd., cis isomer ratio: 60%, APHA: 80), and the results are shown in Table 1.

Example 7

The same procedure as Example 1 was carried out, except for using TMCB (Tokyo Chemical Industry Co., Ltd., cis isomer ratio: 45%, APHA: 50), and the results are shown in Table 2.

Example 8

The same procedure as Example 1 was carried out, except for using TMCB (Tokyo Chemical Industry Co., Ltd., cis isomer ratio: 48%, APHA: 150), and the results are shown in Table 2.

Example 9

The same procedure as Example 1 was carried out, except for using 0.44 parts of barium stearate instead of sodium hydroxide as catalyst, and the results are shown in Table 2.

Example 10

The same procedure as Example 1 was carried out, except for using 115 parts of BPTMC and 1725 parts of TMCB (Tokyo Chemical industry Co., Ltd., cis isomer ratio: 60%, APHA: 80), and the results are shown in Table 2.

Example 11

The same procedure as Example 1 was carried out, except for using 2297 parts of BPTMC and 711 parts of TMCB (Tokyo Chemical Industry Co., Ltd., cis isomer ratio: 60%, APHA: 80), and the results are shown in Table 2.

Example 12

The same procedure as Example 1 was carried out, except for using 382 parts of 6,6'-dihydroxy-3,3,3',3'-tetramethyl-1,1'-spirobiindane (abbreviated as BPSBI, Honshu Chemical Industry Co., Ltd.) and 1608 parts of TMCB instead of 383 parts of BPTMC and 1600 parts of TMCB, and the results are shown in Table 3.

Example 13

The same procedure as Example 12 was carried out, except for using 764 parts of BPSBI and 1429 parts of TMCB (Tokyo Chemical Industry Co., Ltd., cis isomer ratio: 80%, APHA: 70), and the results are shown in Table 3.

Example 14

The same procedure as Example 12 was carried out, except for using 1911 parts of BPSBI and 893 parts of TMCB (Tokyo Chemical Industry Co., Ltd., cis isomer ratio: 60%, APHA: 80), and the results are shown in Table 3.

Example 15

The same procedure as Example 12 was carried out, except for changing BPSBI to 1685 parts of spirobichroman (abbreviated as BPSBC, Tokyo Chemical Industry Co., Ltd.) and 1072 parts of TMCB (Tokyo Chemical Industry Co., Ltd., cis isomer ratio: 60%, APHA: 80), and the results are shown in Table 3.

Example 16

The same procedure as Example 12 was carried out, except for using TMCB (Tokyo Chemical Industry Co., Ltd., cis isomer ratio: 45%, API-IA: 50), and the results are shown in Table 4.

Example 17

The same procedure as Example 12 was carried out, except for using TMCB (Tokyo Chemical Industry Co., Ltd., cis isomer ratio: 48%, APHA: 150), and the results are shown in Table 4.

Example 18

The same procedure as Example 12 was carried out, except for using 0.44 parts of barium stearate instead of sodium hydroxide as catalyst, and the results are shown in Table 4.

Example 19

The same procedure as Example 12 was carried out, except for using 114 parts of BPSBI and 1733 parts of TMCB (Tokyo Chemical Industry Co., Ltd., cis isomer ratio: 60%, APHA: 80), and the results are shown in Table 4.

Example 20

The same procedure as Example 12 was carried out, except for using 2290 parts of BPSBI and 715 parts of TMCB (Tokyo Chemical Industry Co., Ltd., cis isomer ratio: 60%, APHA: 80), and the results are shown in Table 4.

Comparative Example 1

Although the same procedure as Example 1 was carried out, except for not using BPTMC and using 1778 parts of TMCB (Tokyo Chemical Industry Co., Ltd., cis isomer ratio: 45%, APHA: 50), extrusion was discontinued, since crystallization occurred during the polymerization reaction.

Comparative Example 2

The same procedure as Example 1 was carried out, except for using 281 parts of bisphenol A instead of BPTMC, and the results are shown in Table 5.

Comparative Example 3

The same procedure as Example 1 was carried out, except for using 1406 parts of bisphenol A instead of BPTMC and 889 parts of TMCB (Tokyo Chemical Industry Co., Ltd., cis isomer ratio: 60%, APHA: 80), and the results are shown in Table 5.

Comparative Example 4

Various evaluations were carried out using polycarbonate resin obtained by using bisphenol A as raw material (Panlite L-1225Y, Teijin Ltd.), and the results are shown in Table 5.

TABLE 1

| Property | | Units | Example 1 | Example 2 | Example 3 | Example 4 | Example 5 | Example 6 |
|---|---|---|---|---|---|---|---|---|
| Copolymer Composition Ratio | BPTMC | Mol % | 10 | 20 | 50 | 0 | 0 | 0 |
| | BPZ | | 0 | 0 | 0 | 30 | 0 | 0 |
| | BPOCZ | | 0 | 0 | 0 | 0 | 50 | 0 |
| | BPOCTMC | | 0 | 0 | 0 | 0 | 0 | 20 |
| | TMCB | | 90 | 80 | 50 | 70 | 50 | 80 |
| Raw Material Quality | Cis ratio | Mol % | 60 | 80 | 60 | 60 | 60 | 60 |
| | APHA | — | 80 | 70 | 80 | 80 | 80 | 80 |
| | Aromatic Monohydroxy Compound | ppm | 325 | 428 | 541 | 679 | 984 | 402 |
| | Viscosity Average Molecular Weight | ×1000 | 15.8 | 22.5 | 25.2 | 19.6 | 28.3 | 27.4 |
| Heat Resistance | Tg | ° C. | 129 | 141 | 174 | 131 | 126 | 127 |
| | Specific Gravity | — | 1.04 | 1.06 | 1.1 | 1.07 | 1.08 | 1.05 |
| Surface Hardness | Pencil hardness | — | HB | HB | HB | HB | H | F |
| Chemical Resistance | Gasoline resistance | % | >1.0 | >1.0 | 0.7 | >1.0 | 0.6 | >1.0 |
| Weather Resistance | Initial hue (YI) | — | 1.9 | 1.8 | 2.1 | 1.9 | 2.4 | 2.2 |
| | Color difference (ΔE) | — | 3 | 3.8 | 5.5 | 3.2 | 5.8 | 4.5 |
| Impact Resistance | High-speed surface impact test | Fracture energy | 32 J | 35 J | 35 J | 30 J | 26 J | 28 J |
| | | Fracture morphology | Ductile fracture | Ductile fracture | Ductile fracture | Ductile fracture | Ductile fracture | Ductile fracture |
| GPC | Number avg. MW | ×1000 | 15.4 | 21.8 | 24.3 | 18.5 | 26.8 | 25.3 |
| | MW distribution | Mw/Mn | 2.1 | 2.2 | 2.2 | 2.2 | 2.4 | 2.4 |

TABLE 2

| Property | | Units | Example 7 | Example 8 | Example 9 | Example 10 | Example 11 |
|---|---|---|---|---|---|---|---|
| Copolymer Composition Ratio | BPTMC | Mol % | 10 | 10 | 10 | 3 | 60 |
| | BPZ | | 0 | 0 | 0 | 0 | 0 |
| | BPOCZ | | 0 | 0 | 0 | 0 | 0 |
| | BPOCTMC | | 0 | 0 | 0 | 0 | 0 |
| | TMCB | | 90 | 90 | 90 | 97 | 40 |
| Raw Material Quality | Cis ratio | Mol % | 45 | 48 | 60 | 60 | 60 |
| | APHA | — | 50 | 150 | 80 | 80 | 80 |
| | Aromatic Monohydroxy Compound | ppm | 390 | 296 | 243 | 1,745 | 877 |
| | Viscosity Average Molecular Weight | ×1000 | 15.6 | 16.6 | 16.2 | 9.8 | 19.9 |
| Heat Resistance | Tg | ° C. | 131 | 128 | 130 | 114 | 188 |
| | Specific Gravity | — | 1.04 | 1.04 | 1.04 | 1.04 | 1.03 |
| Surface Hardness | Pencil hardness | — | HB | HB | HB | HB | HB |
| Chemical Resistance | Gasoline resistance | % | >1.0 | >1.0 | >1.0 | >1.0 | 0.4 |
| Weather Resistance | Initial hue (YI) | — | 2.1 | 4.1 | 1.7 | 3.5 | 2.0 |
| | Color difference (ΔE) | — | 3.5 | 8.4 | 2.9 | 3.1 | 9.2 |
| Impact Resistance | High-speed surface impact test | Fracture energy | <1 J | <1 J | 30 J | <1 J | 30 J |
| | | Fracture morphology | Ductile fracture | Ductile fracture | Ductile fracture | Ductile fracture | Ductile fracture |
| GPC | Number avg. MW | ×1000 | 14.3 | 15.5 | 15.1 | 7.4 | 18.1 |
| | MW distribution | Mw/Mn | 2.1 | 2.2 | 2.2 | 3.1 | 2.2 |

TABLE 3

| Property | | Units | Example 12 | Example 13 | Example 14 | Example 15 |
|---|---|---|---|---|---|---|
| Copolymer Composition Ratio | BPSBI | Mol % | 10 | 20 | 50 | 0 |
| | BPSBC | | 0 | 0 | 0 | 40 |
| | TMCB | | 90 | 80 | 50 | 60 |
| Raw Material Quality | Cis ratio | Mol % | 60 | 80 | 60 | 60 |
| | APHA | — | 80 | 70 | 80 | 80 |
| | Aromatic Monohydroxy Compound | ppm | 430 | 412 | 296 | 543 |
| | Viscosity Average Molecular Weight | ×1000 | 19.8 | 21.6 | 25.4 | 15.8 |
| Heat Resistance | Tg | ° C. | 131 | 138 | 168 | 151 |
| | Specific Gravity | — | 1.03 | 1.04 | 1.06 | 1.05 |
| Surface Hardness | Pencil hardness | — | HB | F | F | F |
| Chemical Resistance | Gasoline resistance | % | >1.0 | >1.0 | 0.6 | >1.0 |
| Weather Resistance | Initial hue (YI) | — | 2.1 | 2.2 | 2.4 | 1.8 |
| | Color difference (ΔE) | — | 3.1 | 3.2 | 3.6 | 2.9 |
| Impact Resistance | High-speed surface impact test | Fracture energy | 35 J | 33 J | 30 J | 32 J |
| | | Fracture morphology | Ductile fracture | Ductile fracture | Ductile fracture | Ductile fracture |
| GPC | Number avg. MW | ×1000 | 18.6 | 21.1 | 24.5 | 14.1 |
| | MW distribution | Mw/Mn | 2.2 | 2.2 | 2.3 | 2.2 |

TABLE 4

| Property | | Units | Example 16 | Example 17 | Example 18 | Example 19 | Example 20 |
|---|---|---|---|---|---|---|---|
| Copolymer Composition Ratio | BPSBI | Mol % | 10 | 10 | 10 | 3 | 60 |
| | TMCB | | 90 | 90 | 90 | 97 | 40 |
| Raw Material Quality | Cis ratio | Mol % | 45 | 48 | 60 | 60 | 60 |
| | APHA | — | 50 | 150 | 80 | 80 | 80 |
| | Aromatic Monohydroxy Compound | ppm | 454 | 422 | 398 | 1,522 | 877 |
| | Viscosity Average Molecular Weight | ×1000 | 19.4 | 19.9 | 20.1 | 9.8 | 19.9 |
| Heat Resistance | Tg | ° C. | 130 | 131 | 132 | 118 | 177 |
| | Specific Gravity | — | 1.03 | 1.03 | 1.03 | 1.02 | 1.03 |
| Surface Hardness | Pencil hardness | — | HB | HB | HB | HB | HB |
| Chemical Resistance | Gasoline resistance | % | >1.0 | >1.0 | >1.0 | >1.0 | 0.3 |
| Weather Resistance | Initial hue (YI) | — | 2.2 | 3.9 | 1.6 | 3.8 | 5.9 |
| | Color difference (ΔE) | — | 3.1 | 6.7 | 2.8 | 4.0 | 10.3 |
| Impact Resistance | High-speed surface impact test | Fracture energy | <1 J | <1 J | 30 J | <1 J | 30 J |
| | | Fracture morphology | Ductile fracture | Ductile fracture | Ductile fracture | Ductile fracture | Ductile fracture |
| GPC | Number avg. MW | ×1000 | 18.2 | 19.1 | 19.4 | 6.8 | 18.8 |
| | MW distribution | Mw/Mn | 2.1 | 2.2 | 2.2 | 3.4 | 2.3 |

TABLE 5

| Property | | Units | Comparative Example 1 | Comparative Example 2 | Comparative Example 3 | Comparative Example 4 |
|---|---|---|---|---|---|---|
| Copolymer Composition Ratio | BPTMC | Mol % | 0 | 0 | 0 | 0 |
| | BPZ | | 0 | 0 | 0 | 0 |
| | BPOCZ | | 0 | 0 | 0 | 0 |
| | BPA | | 0 | 10 | 50 | 100 |
| | BPOCTMC | | 0 | 0 | 0 | 0 |
| | TMCB | | 100 | 90 | 50 | 0 |
| Raw Material Quality | Cis ratio | Mol % | 45 | 48 | 60 | — |
| | APHA | — | 50 | 150 | 80 | — |
| | Aromatic Monohydroxy Compound | ppm | 2,163 | 1124 | 981 | 0 |
| | Viscosity Average Molecular Weight | ×1000 | Unable to be measured due to crystallization | 19.5 | 19.8 | 22.5 |
| Heat Resistance | Tg | ° C. | | 113 | 123 | 148 |
| | Specific Gravity | — | | 1.06 | 1.12 | 1.2 |
| Surface Hardness | Pencil hardness | — | | B | B | 2B |
| Chemical Resistance | Gasoline resistance | % | | >1.0 | <0.1 | <0.1 |
| Weather Resistance | Initial hue (YI) | — | | 2.8 | 2.6 | 1.8 |
| | Color difference (ΔE) | — | | 4.2 | 10.2 | 15.2 |
| Impact Resistance | High-speed surface impact test | Fracture energy | | 35 J | 37 J | 40 J |
| | | Fracture morphology | | Ductile fracture | Ductile fracture | Ductile fracture |
| GPC | Number avg. MW | ×1000 | Unmeasurable | 18.3 | 18.7 | 22.0 |
| | MW distribution | Mw/Mn | Unmeasurable | 2.3 | 2.3 | 2.4 |

On the basis of these results, the polycarbonate copolymers according to Examples 1 to 20 can be understood to have low specific gravity and high surface hardness. In addition, the polycarbonate copolymers according to Examples 1 to 20 can be understood to have satisfactory heat resistance, weather resistance and solvent resistance.

INDUSTRIAL APPLICABILITY

The polycarbonate copolymer or resin composition of the present invention can be used in automobile interior parts such as interior lighting lamp lenses, display meter covers, meter dials, various switch covers, display covers, heater control panels, instrument panels, center clusters, center panels, room lamp lenses or head-up displays, automobile exterior parts such as headlamp lenses, back doors, bumpers, fenders, door handles, emblems or glazing, and motorcycle exterior panels.

The invention claimed is:

1. A polycarbonate copolymer containing a unit (A) represented by the following formula (1-1) or (1-2) and a unit (B) represented by the following formula (3):

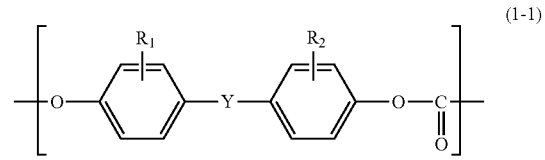

wherein, $R_1$ and $R_2$ respectively and independently represent a hydrogen atom, hydrocarbon group having 1 to 10 carbon atoms that may contain an aromatic group, or halogen atom, and Y represents a divalent organic residue comprised of the following formula (2):

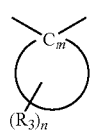

wherein, $C_m$ represents a cycloalkylene group, m represents an integer of 3 to 20, $R_3$ represents a hydrogen atom, halogen atom, alkyl group having 1 to 20 carbon atoms or cycloalkyl group having 3 to 20 carbon atoms, and n represents an integer of 1 to 10;

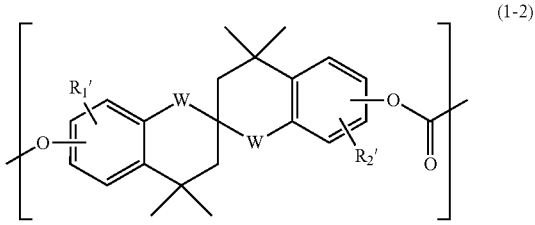
(1-2)

wherein, $R_1'$ and $R_2'$ respectively and independently represent a hydrogen atom, hydrocarbon group having 1 to 10 carbon atoms that may contain an aromatic group or a halogen atom, and W represents a single bond, carbon atom, oxygen atom or sulfur atom;

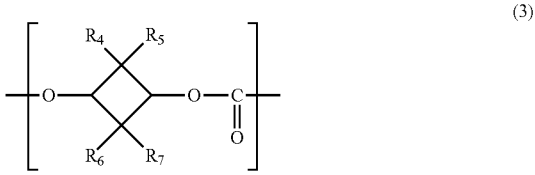
(3)

wherein, $R_4$, $R_5$, $R_6$ and $R_7$ respectively and independently represent a hydrogen atom, halogen atom, alkyl group having 1 to 20 carbon atoms or cycloalkyl group having 3 to 20 carbon atoms, and wherein a number average molecular weight as polystyrene as determined by gel permeation chromatography is within a range of 10,000 to 100,000, and a molecular weight distribution (Mw/Mn) is within a range of 1.5 to 3.0.

2. The polycarbonate copolymer according to claim 1, wherein a dihydroxy compound from which unit (B) is derived is a mixture of cis-trans isomers and a ratio of the cis isomer in the mixture is 50% or more.

3. The polycarbonate copolymer according to claim 1, wherein a dihydroxy compound from which unit (B) is derived has a Hazen color number (APHA) when melted in a nitrogen atmosphere at 220° C. of 100 or less.

4. The polycarbonate copolymer according to claim 1, wherein a viscosity average molecular weight is 10,000 to 40,000.

5. The polycarbonate copolymer according to claim 1, containing a unit represented by the following formula (4) as unit (A):

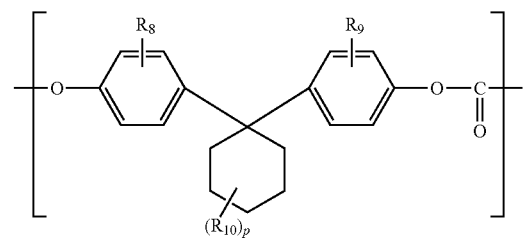
(4)

wherein, $R_8$ and $R_9$ respectively and independently represent a hydrogen atom, hydrocarbon group having 1 to 10 carbon atoms that may contain an aromatic group, or halogen atom, $R_{10}$ represents a hydrogen atom, halogen atom, alkyl group having 1 to 20 carbon atoms or cycloalkyl group having 3 to 20 carbon atoms, and p represents an integer of 1 to 10.

6. The polycarbonate copolymer according to claim 1, containing a unit derived from 1,1-bis(4-hydroxyphenyl)-3,3,5-trimethylcyclohexane as unit (A).

7. The polycarbonate copolymer according to claim 1, containing a unit derived from 6,6'-dihydroxy-3,3,3',3'-tetramethyl-1,1'-spirobiindane as unit (A).

8. The polycarbonate copolymer according to claim 1, containing a unit derived from 2,2,4,4-tetramethyl-1,3-cyclobutanediol as unit (B).

9. The polycarbonate copolymer according to claim 1, further containing a structural unit derived from at least one compound selected from the group consisting of aliphatic dihydroxy compounds, alicyclic dihydroxy compounds, oxyalkylene glycols and diols having a cyclic acetal structure.

10. The polycarbonate copolymer according to claim 1, containing unit (A) represented by formula (1-1) and unit (B) represented by formula (2) as main structural units, and wherein a molar ratio (AB) of unit (A) to unit (B) is 5/95 to 50/50.

11. The polycarbonate copolymer according to claim 1, containing unit (A) represented by formula (1-2) and unit (B) represented by formula (2), and wherein a glass transition temperature is 126° C. to 175° C. and a specific gravity as measured according to the method described in JIS 7112 is 1.10 or less.

12. A resin molded article containing the polycarbonate copolymer according to claim 1.

13. An automobile interior part or automobile exterior part containing the resin molded article according to claim 12.

14. A method for producing the polycarbonate copolymer according to claim 1, comprising: performing a transesterification reaction between a dihydroxy compound and a carbonic acid diester carried out in the presence of an alkaline metal catalyst and/or alkaline earth metal catalyst, wherein an amount used of the alkaline metal catalyst and/or alkaline earth metal catalyst is within a range of 0.1 μmol to 500 μmol per 1 mol of the dihydroxy compound.

* * * * *